(12) United States Patent
Ko et al.

(10) Patent No.: US 12,111,532 B2
(45) Date of Patent: Oct. 8, 2024

(54) OPTICAL BODY AND DISPLAY DEVICE INCLUDING SAME

(71) Applicant: Toray Advanced Materials Korea Inc., Gyeongsangbuk-do (KR)

(72) Inventors: Seung Jin Ko, Gyeongsangbuk-do (KR); Bae Keun Yoo, Gyeongsangbuk-do (KR); Jong Dae Sung, Gyeongsangbuk-do (KR)

(73) Assignee: Toray Advanced Materials Korea Inc., Gyeongsangbuk-do (KR)

( * ) Notice: Subject to any disclaimer, the term of this patent is extended or adjusted under 35 U.S.C. 154(b) by 757 days.

(21) Appl. No.: 17/294,999

(22) PCT Filed: Nov. 12, 2019

(86) PCT No.: PCT/KR2019/015335
§ 371 (c)(1),
(2) Date: May 18, 2021

(87) PCT Pub. No.: WO2020/105931
PCT Pub. Date: May 28, 2020

(65) Prior Publication Data
US 2022/0011630 A1    Jan. 13, 2022

(30) Foreign Application Priority Data

Nov. 22, 2018 (KR) .................. 10-2018-0145535
Nov. 22, 2018 (KR) .................. 10-2018-0145536
(Continued)

(51) Int. Cl.
*F21V 8/00*     (2006.01)
*G02F 1/1335*   (2006.01)

(52) U.S. Cl.
CPC ..... *G02F 1/133524* (2013.01); *G02B 6/0041* (2013.01); *G02B 6/0065* (2013.01); *G02F 1/133536* (2013.01)

(58) Field of Classification Search
CPC ......... G02F 1/133524; G02F 1/133536; G02B 6/0041; G02B 6/0065
(Continued)

(56) References Cited

U.S. PATENT DOCUMENTS 7,138,058 B2    11/2006  Kurth et al.
2003/0156238 A1*  8/2003  Hiraishi ............... G02B 6/0065
                                                           349/112
(Continued)

FOREIGN PATENT DOCUMENTS

CN    102177447    11/2013
CN    105694053     6/2016
(Continued)

OTHER PUBLICATIONS

KR-20180111704-A—Oct. 2018—Ko Seung Jin—Korea—English translation.*
(Continued)

*Primary Examiner* — Sharrief I Broome
(74) *Attorney, Agent, or Firm* — Morrison & Foerster LLP

(57) ABSTRACT

The present invention relates to an optical body and a display device including the same, and more specifically, the present invention relates to an optical body, which can minimize optical loss thereof and maximize luminance enhancement thereof, and a display device including the same.

15 Claims, 9 Drawing Sheets

(30) Foreign Application Priority Data

Nov. 22, 2018 (KR) ......................... 10-2018-0145594
Nov. 26, 2018 (KR) ......................... 10-2018-0147451

(58) Field of Classification Search
USPC .......................................................... 359/896
See application file for complete search history.

(56) References Cited

U.S. PATENT DOCUMENTS

| | | | |
|---|---|---|---|
| 2006/0204744 A1* | 9/2006 | Hiraishi | G02B 5/0257 428/327 |
| 2008/0185332 A1 | 8/2008 | Niu et al. | |
| 2010/0195313 A1* | 8/2010 | Hiraishi | G02B 5/0257 524/508 |
| 2012/0200931 A1* | 8/2012 | Haag | G02B 5/0242 521/122 |
| 2021/0291119 A1 | 9/2021 | Lee et al. | |
| 2021/0322927 A1 | 10/2021 | Cho et al. | |

FOREIGN PATENT DOCUMENTS

| | | |
|---|---|---|
| CN | 105771672 | 7/2016 |
| JP | 2000-354743 | 12/2000 |
| JP | 2007-111606 | 5/2007 |
| JP | 2007-167783 | 7/2007 |
| JP | 2009-045595 | 3/2009 |
| JP | 2009-149573 | 7/2009 |
| JP | 2011-005455 | 1/2011 |
| JP | 2014-083515 | 5/2014 |
| JP | 2017-000939 | 1/2017 |
| JP | 2017-119932 | 7/2017 |
| KR | 10-0169484 | 10/1998 |
| KR | 10-0865625 | 10/2008 |
| KR | 10-2010-0131423 | 12/2010 |
| KR | 10-2012-0087416 | 8/2012 |
| KR | 10-2012-0098741 | 9/2012 |
| KR | 10-2014-0021270 | 2/2014 |
| KR | 10-2014-0046952 | 4/2014 |
| KR | 10-2014-0138651 | 12/2014 |
| KR | 10-2015-0077062 | 7/2015 |
| KR | 10-2015-0079146 | 7/2015 |
| KR | 10-2015-0079168 | 7/2015 |
| KR | 10-2015-0079170 | 7/2015 |
| KR | 10-2016-0081606 | 7/2016 |
| KR | 10-2017-0103541 | 9/2017 |
| KR | 10-2017-0112994 | 10/2017 |
| KR | 10-2017-0126693 | 11/2017 |
| KR | 10-2018-011327 | 10/2018 |
| KR | 10-2018-0111704 | 10/2018 |
| KR | 20180111704 A * | 10/2018 ........... G02B 5/3025 |
| TW | I467259 | 1/2015 |

OTHER PUBLICATIONS

U.S. Appl. No. 17/761,146, filed Mar. 16, 2022, by Lee et al.
U.S. Appl. No. 17/761,564, filed Mar. 17, 2022, by Lee et al.
U.S. Appl. No. 17/772,997, filed Apr. 28, 2022, by Park et al.
U.S. Appl. No. 17/788,040, filed Jun. 22, 2022, by Yoon et al.
Ramadan et al. "Review on Recent Applications of Antimicrobial Agents for Polyamide and Polypropylene." Al-Azhar Bulletin of Science (2012) 23.2-A: 1-28.

\* cited by examiner

[FIG. 1]
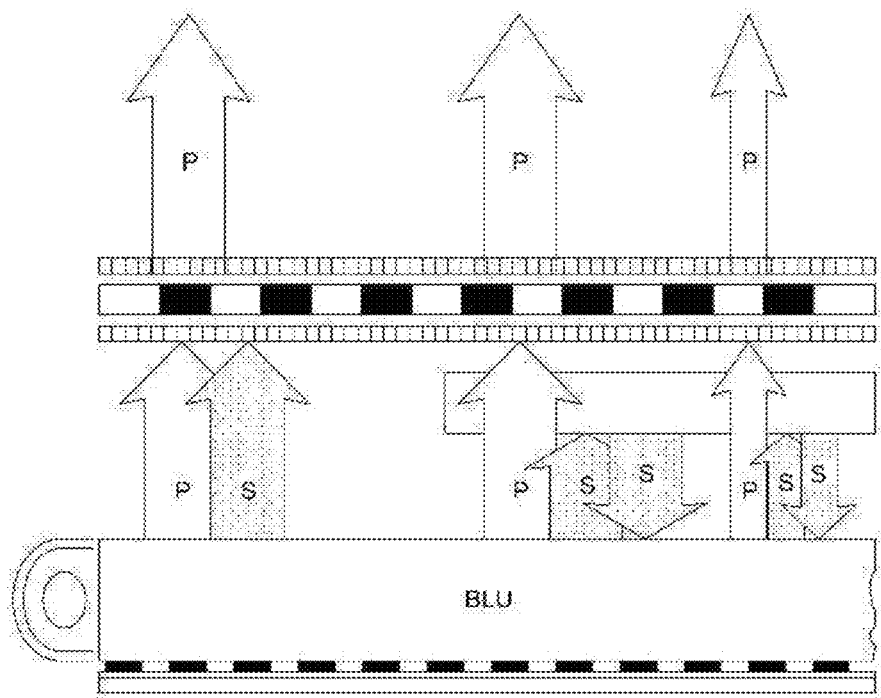
[FIG. 2]
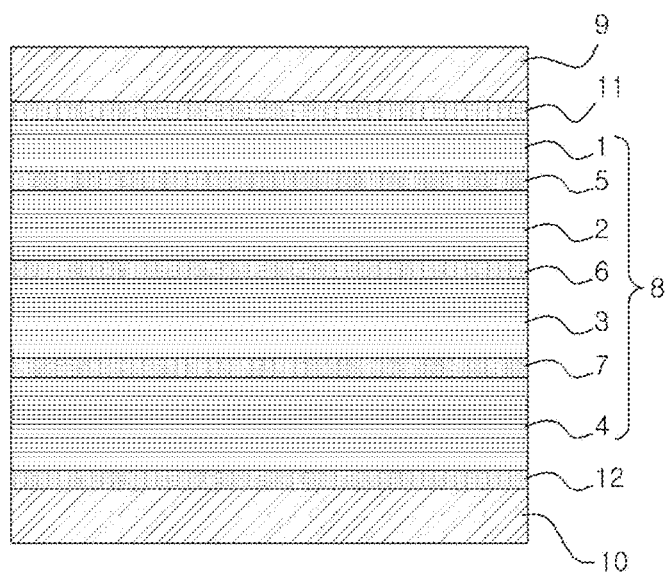

[FIG. 3]
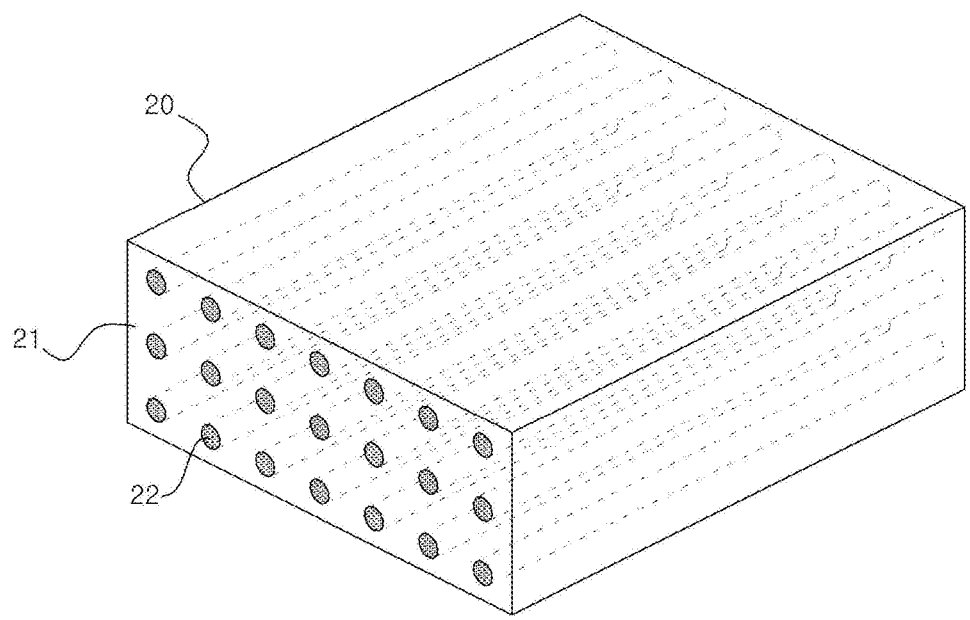
[FIG. 4]
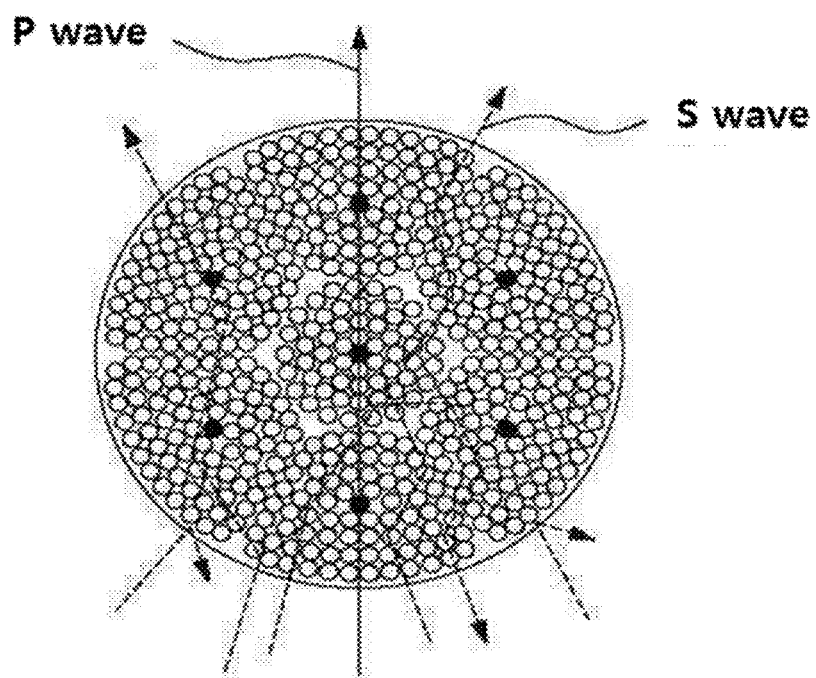

[FIG. 5]
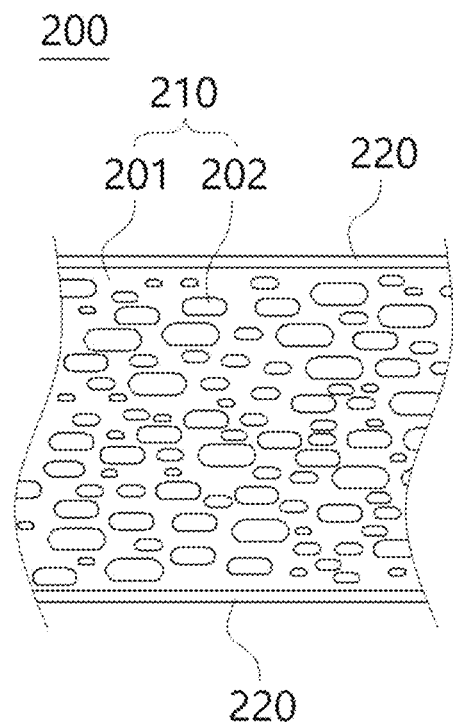
[FIG. 6]
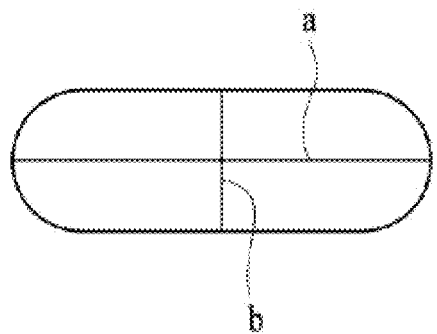

[FIG. 7]
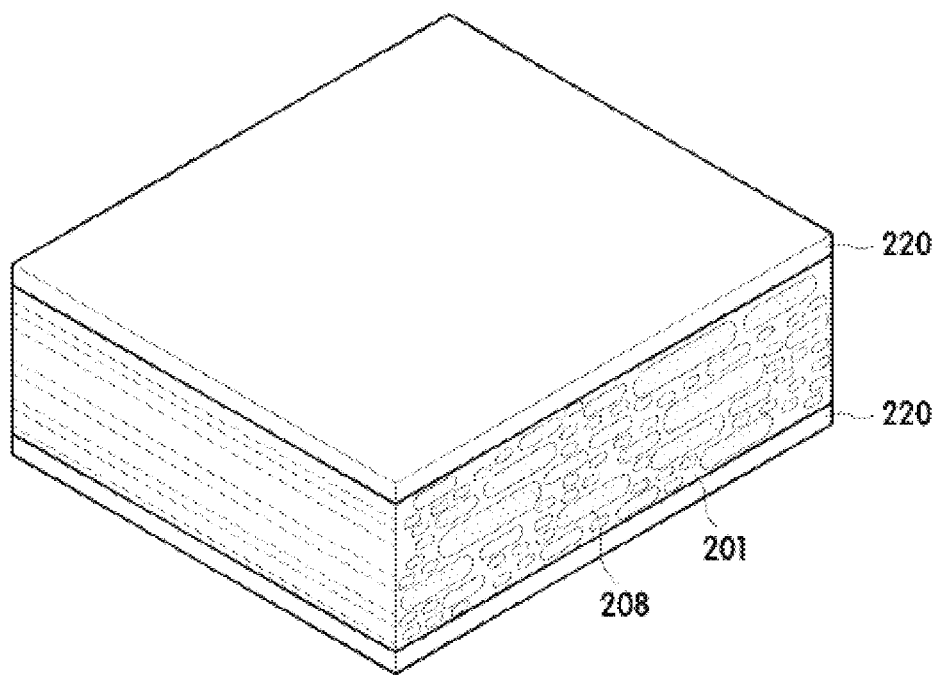

[FIG. 8]
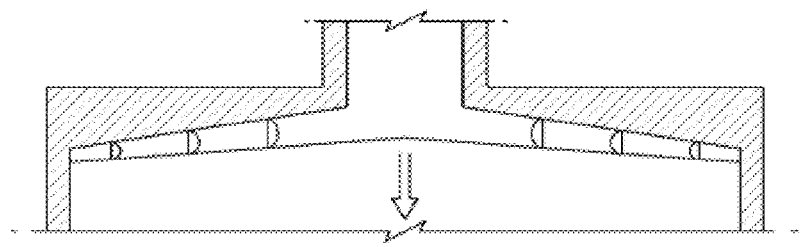
[FIG. 9]
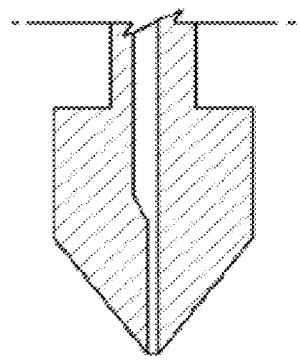
[FIG. 10]
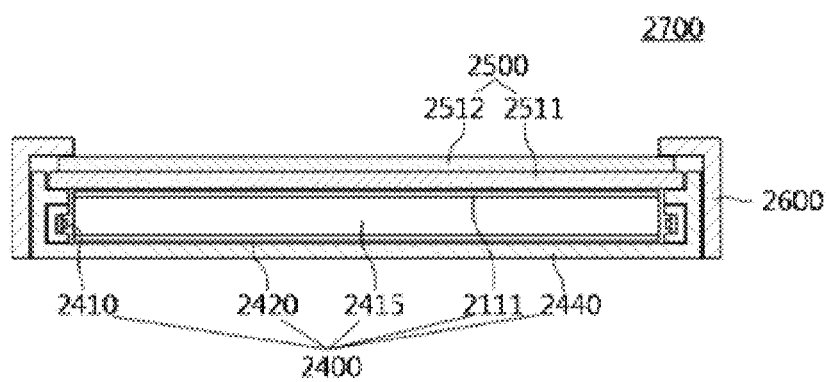

[FIG. 11]
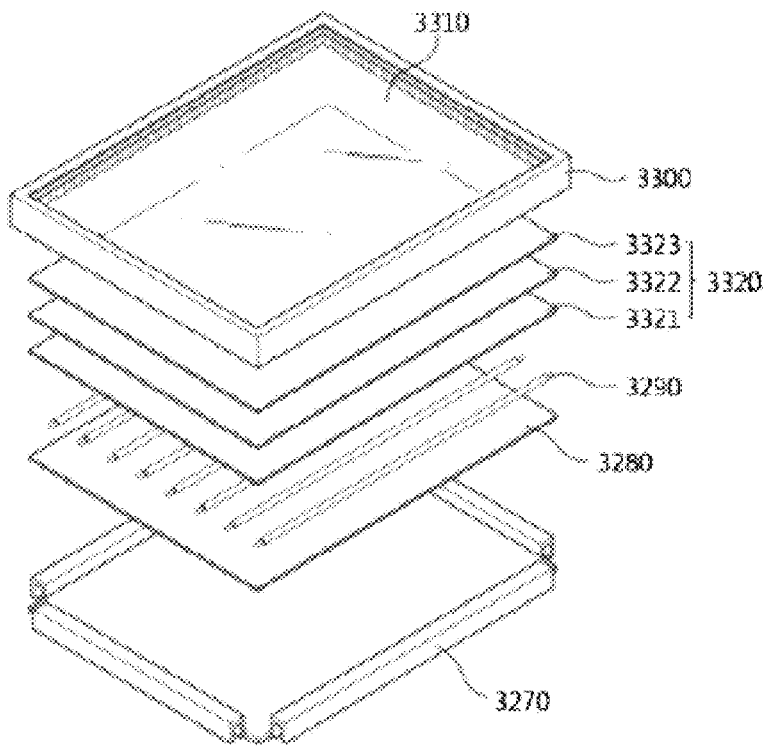
[FIG. 12]
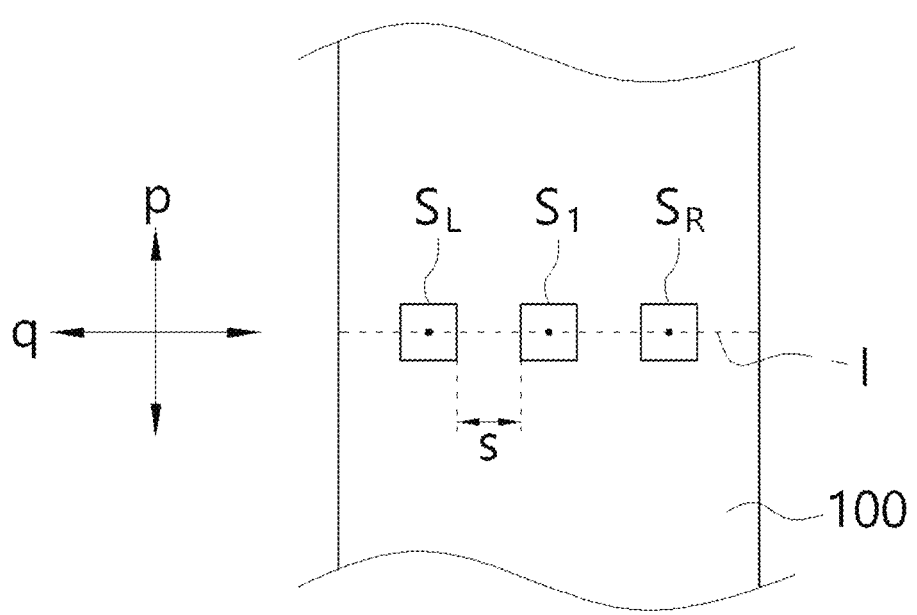

[FIG. 13]
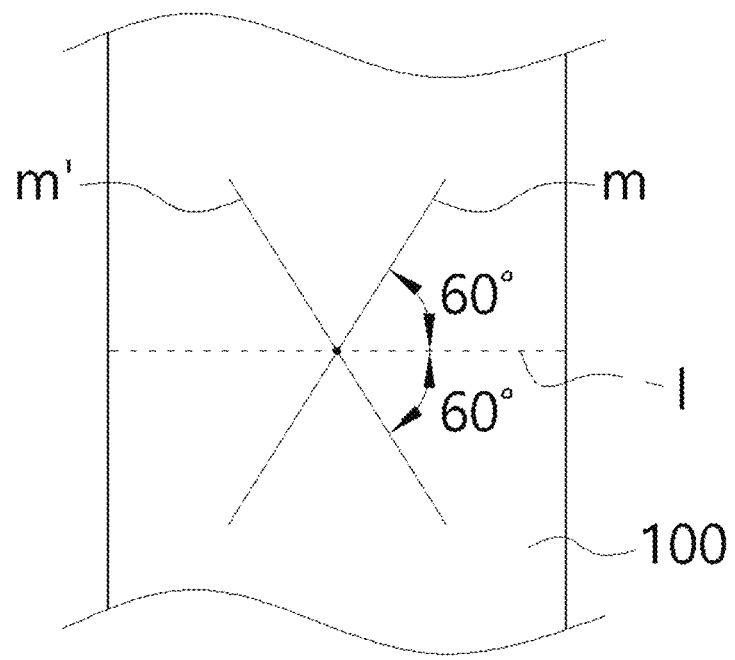
[FIG. 14]
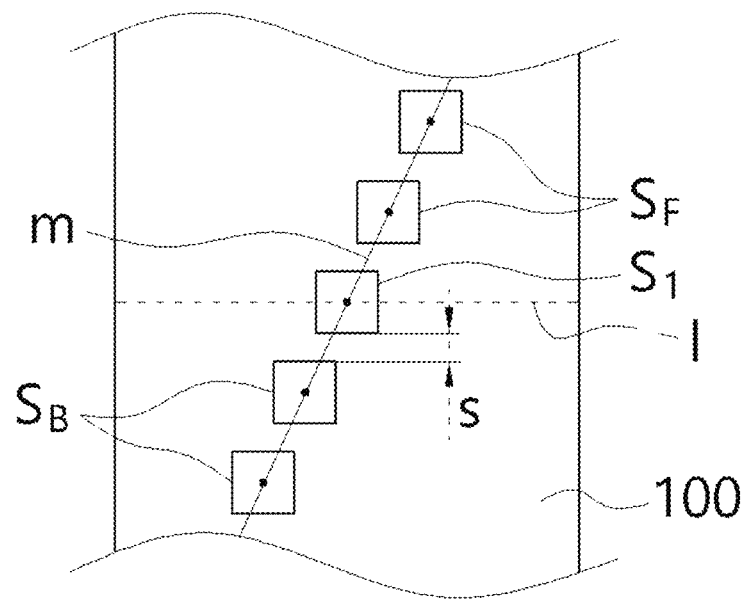

[FIG. 15]
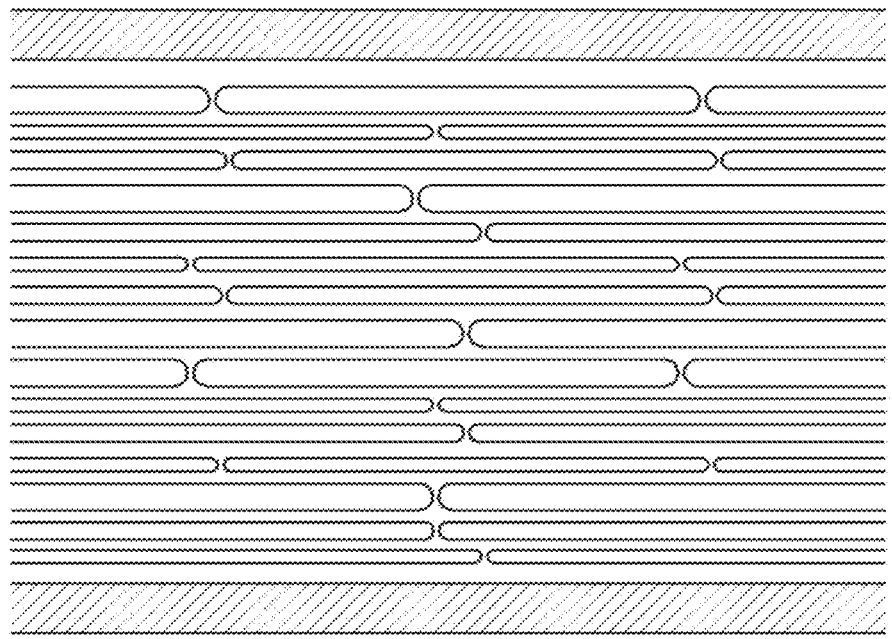
[FIG. 16]
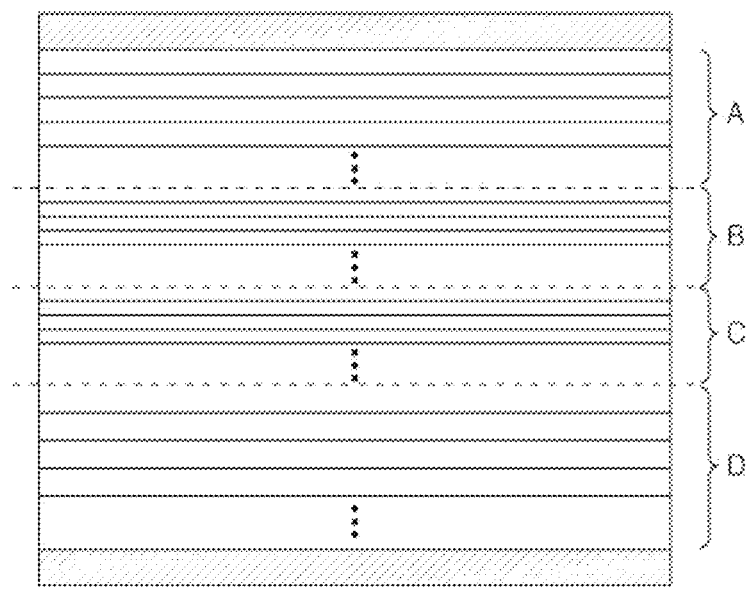

[FIG. 17]
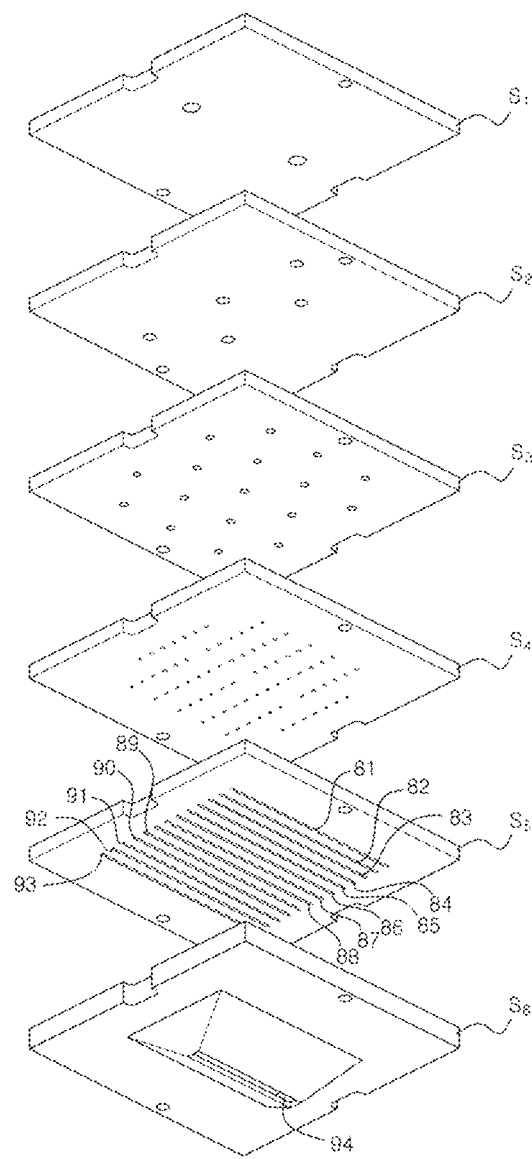

OPTICAL BODY AND DISPLAY DEVICE INCLUDING SAME

CROSS REFERENCE TO RELATED APPLICATIONS

This application is a national stage application under 35 U.S.C. § 371 of International Application No. PCT/KR2019/015335, filed internationally on Nov. 12, 2019, which claims priority to and the benefit of Korean Patent Application No. 10-2018-0145535, filed on Nov. 22, 2018, Korean Patent Application No. 10-2018-0145536, filed on Nov. 22, 2018, Korean Patent Application No. 10-2018-0145594, filed on Nov. 22, 2018 and Korean Patent Application No. 10-2018-0147451, filed on Nov. 26, 2018, the disclosures of which are incorporated herein by reference in their entirety.

TECHNICAL FIELD

The present invention relates to an optical body and a display device including the same, and more specifically, the present invention relates to an optical body, which can minimize optical loss thereof and maximize luminance enhancement thereof, and a display device including the same.

In addition, the present invention relates to an optical body with uniform optical properties and a display device including the same.

BACKGROUND ART

The flat panel display technology is mainly composed of liquid crystal displays (LCD), projection displays, and plasma displays (PDP), which have already secured a market in the TV field as the mainstream, and in addition, field emission displays (FED), electroluminescent displays (ELD), and the like are expected to occupy the field according to each characteristic along with the improvement of related technologies. The usage range of liquid crystal displays that are currently used in laptops, personal computer monitors, liquid crystal TVs, automobiles, aircraft, and the like is expanding, and they are occupying about 80% of the flat panel market. Globally, the demand for LCD has increased rapidly, and it is enjoying an economic boom until today.

In a conventional liquid crystal display, liquid crystals and an electrode matrix are disposed between a pair of absorbent optical films. In a liquid crystal display, the liquid crystal portion has an optical state that changes accordingly by moving the liquid crystal portion by an electric field generated by applying a voltage to both electrodes. This processing displays an image of 'pixels' carrying information using polarized light in a specific direction. For this reason, liquid crystal displays include a front optical film and a back optical film that induce polarization.

The optical film used in such a liquid crystal display cannot necessarily be said to have high utilization efficiency of light emitted from a backlight. This is because 50% or more of the light emitted from the backlight is absorbed by the back-side optical film (absorption-type polarizing film). Therefore, in order to increase the utilization efficiency of backlight light in a liquid crystal display, an optical body is installed between the optical cavity and the liquid crystal assembly.

FIG. 1 is a diagram illustrating the optical principle of a conventional optical body. Specifically, P-polarized light among the light directed from an optical cavity to a liquid crystal assembly passes through an optical body and is transmitted to the liquid crystal assembly, and S-polarized light is reflected from the optical body to the optical cavity. Then, it is reflected while the polarization direction of light is in a randomized state on the diffuse reflection surface of the optical cavity and is transmitted back to the optical body. Finally, the S-polarized light is converted into P-polarized light that can pass through the polarizer of the liquid crystal assembly and then transmitted to the liquid crystal assembly after passing through the optical body.

The selective reflection of the S-polarized light with respect to the incident light of the optical body and the transmission of the P-polarized light are determined by the difference in refractive indices between each optical layer, the optical thickness setting of each optical layer according to the elongation treatment of a laminated optical layer, and the change in the refractive index of the optical layer, in a state in which a flat optical layer having an anisotropic refractive index and a flat optical layer having an isotropic refractive index are alternately laminated.

That is, the light incident on the optical body passes through each optical layer and repeats the reflection of the S-polarized light and the transmission of the P-polarized light, and eventually, only the P-polarized light among the incident polarized light is transmitted to the liquid crystal assembly. Meanwhile, as described above, the reflected S-polarized light is reflected in a state in which the polarization status is randomized on the diffuse reflection surface of the optical cavity, and is transmitted to the optical body again. As a result, it was possible to reduce power waste and loss of light generated from a light source.

Nonetheless, such a conventional optical body is manufactured to have an optical thickness and refractive index between each optical layer that can be optimized for selective reflection and transmission of incident polarized light by alternately laminating an isotropic optical layer and an anisotropic optical layer on flat plates having different refractive indices and elongating the same, and thus, there is a problem that the manufacturing process of the optical body is complicated. In particular, since each optical layer of the optical body has a flat-plate structure, the P-polarized light and the S-polarized light must be separated by corresponding to a wide range of incident angles of incident polarized light, and thus, there were problems that the number of laminated optical layers increased excessively and the production cost increased exponentially. In addition, due to the structure in which the number of laminated optical layers was excessively formed, there was a problem that optical performance may be deteriorated due to optical loss.

FIG. 2 is a cross-sectional view of a dual brightness enhancement film (DBEF), which is one of the conventional optical bodies. Specifically, in the dual brightness enhancement film, skin layers 9 and 10 are formed on both sides of a substrate 8. The substrate 8 is divided into four groups 1, 2, 3, and 4, in which the isotropic layer and the anisotropic layer are alternately laminated to form approximately 200 layers. Meanwhile, between the four groups 1, 2, 3, and 4 forming the substrate 8, separate adhesive layers 5, 6, and 7 for bonding the same are formed. In addition, since each group has a very thin thickness of about 200 layers, when these groups are individually coextruded, each group may be damaged, and thus, there were many cases in which the groups included a protective layer (PBL). In this case, there were problems in that the thickness of the substrate became thick and the manufacturing cost increased.

In addition, in the case of a dual brightness enhancement film included in a display panel, since the thickness of a substrate is limited for slimness, the substrate is reduced by the thickness thereof when the adhesive layer is formed on a substrate and/or a skin layer, and thus, there was a problem that it was not very good for the enhancement of the optical properties. Furthermore, since the inside of the substrate, the substrate, and the skin layer are bonded with adhesive layers, there were problems that interlayer peeling occurred when an external force was applied, a long tune had elapsed, or the storage place was poor. In addition, in the adhesion process of an adhesive layer, not only the defect rate was too high, but also due to the formation of the adhesive layer, there was a problem that offset interference with respect to the light source occurred.

Skin layers 9 and 10 are formed on both sides of the substrate 8, and separate adhesive layers 11 and 12 are formed to bond the same between the substrate 8 and the skin layers 9 and 10. When the conventional polycarbonate skin layer and PEN-coPEN are integrated through an alternately laminated substrate and coextrusion, peeling may occur due to a compatibility member, and due to the crystallinity within 15%, the risk of the occurrence of birefringence with respect to the elongation axis during the stretching process is high. Accordingly, it was inevitable to form an adhesive layer in order to apply a polycarbonate sheet of a non-stretching process. As a result, a yield decrease due to the occurrence of foreign substances and process defects appeared due to the addition of an adhesive layer process. Conventionally, when producing a polycarbonate non-stretched sheet of a skin layer, birefringence occurred due to uneven shear pressures by the winding process, and in order to compensate for this, separate controls such as modification of the molecular structure of polymers, speed control of the extrusion line, and the like were required, resulting in a decrease in productivity.

When the method of manufacturing a conventional dual brightness enhancement film is briefly explained, four groups having different average optical thicknesses forming a substrate are separately coextruded, and after stretching the four coextruded groups again, the four stretched groups are adhered together by an adhesive to produce a substrate. This is because peeling occurs when the substrate is stretched after adhesive bonding. Thereafter, skin layers are adhered to both surfaces of the substrate. Eventually, in order to make a multilayer structure, a single group (209 layers) is formed and coextruded through a process of folding a two-layer structure to make a four-layer structure, and then creating a multilayer structure by a continuous folding method, and thus, it was difficult to form a group inside multiple layers in one process because it could not change the thickness. As a result, it was inevitable that four groups having different average optical thicknesses were coextruded separately and then bonded together.

Since the above-described process is intermittently performed, it caused a significant increase in manufacturing costs, and as a result, there was a problem that the cost was the most expensive among all the optical films included in a backlight unit. Accordingly, a serious problem has occurred in that a. liquid crystal display excluding a reflective polarizer was frequently released even at the expense of luminance deterioration in terms of cost reduction.

Accordingly, an optical body has been proposed in which a dispersion capable of achieving the function of an optical body is dispersed by arranging a birefringent polymer elongated in a longitudinal direction inside a substrate other than a dual brightness enhancement film. FIG. 3 is a perspective view of an optical body 20 including a rod-shaped polymer, in which a birefringent polymer 22 elongated in a longitudinal direction inside a substrate 21 is arranged in one direction. Through this, it is possible to perform the function of an optical body by inducing a light modulation effect by a birefringent interface between the substrate 21 and the birefringent polymer 22. However, it was difficult to reflect the light in the entire wavelength range of visible light compared to the above-described alternately laminated dual brightness enhancement film, and a problem occurred that the optical modulation efficiency was too low.

As such, there was a problem in that an excessively large number of birefringent polymers 22 must be disposed inside the substrate in order to have similar transmittance and reflexibility as the alternately laminated dual luminance enhancement film. Specifically, in the case of manufacturing a 32-inch horizontal display panel based on the vertical cross-section of an optical body, in order to have optical properties similar to the above-described dual brightness enhancement film inside the substrate 21 having a width of 1,580 mm and a height (thickness) of 400 µm or less, a circular or elliptical birefringent polymer 22 having a cross-sectional diameter of 0.1 µm to 0.3 µm in a longitudinal direction should be included by at least 100 million or more. In this case, not only the production cost was too high, but also the equipment was too complicated, and since it was almost impossible to manufacture equipment that produced the same, there was a problem that it was difficult to commercialize the same. In addition, since it was difficult to variously configure the optical thickness of the birefringent polymer 22 included in the sheet, it was difficult to reflect light in the entire wavelength region of visible light, and thus, there was a problem in that physical properties were reduced.

In order to overcome the above, a technical idea including a birefringent island-in-the-sea yarns inside a substrate has been proposed. FIG. 4 is a cross-sectional view of a birefringent island-in-the-sea yarn included in a substrate, and since the birefringent island-in-the-sea yarn. can generate a light modulation effect at the optical modulation interface between the inner island portion and the sea portion, optical properties can be achieved even without arranging a very large number of island-in-the-sea yarns like the birefringent polymer described above. However, since birefringent island-in-the-sea yarns are fibers, problems of compatibility with polymer substrates, ease of handling, and adhesion have occurred.

Furthermore, due to the circular shape, light scattering was induced, and the reflected polarization efficiency for the optical wavelength in the visible light region was lowered, and thus, the polarization characteristics were lowered compared to the existing products, and there was a limit to improve the brightness. Moreover, in the case of island-in-the-sea yarns, since the sea component region is subdivided while reducing a conduction junction phenomenon, light leakage, that is, a factor of deterioration of optical characteristics due to a light loss phenomenon, occurred due to the occurrence of voids. In addition, there was a problem in that limitation of the enhancement of reflection and polarization characteristics occurred due to the limitation of the layer composition due to the organization structure in the form of a fabric. In addition, in the case of such an optical body, a problem in which a bright line was observed due to the space between the layers and the space between the dispersions occurred.

Meanwhile, in order to induce a difference in refractive indices at the interface between materials constituting a reflective polarizing film, a process of elongating these materials, for example, a stretching process, is essentially required. However, due to such a stretching process, there is a problem in that the in-plane luminance of a film is uneven depending on some cases. Such problems are difficult to design in process conditions and to control the conditions, for example, when the force applied during the stretching process in the longitudinal direction of a film is non-uniform in the width direction, when the stretching speed is not constant, and in the design of heat setting conditions that can be performed after stretching. As it is affected by the type of optical materials constituting the reflective polarizing film, whether impurities are included, and the structure, shape, size, and the like between the optically isotropic material forming the interface and the anisotropic material, luminance deviation occurs at any point in the plane. When the deviation is severe, there is a problem that the image quality is markedly deteriorated, such as the appearance of spots when the image is displayed, or the desired contrast cannot be properly implemented.

Therefore, there is an urgent need to solve such problems and develop a reflective polarizing film in which the deviation of luminance at an arbitrary point in the plane is significantly reduced, even after passing through a stretching process.

DISCLOSURE

Technical Problem

The present invention has been devised in view of the above points, and the optical body of the present invention is capable of maximizing luminance improvement, compared to a conventional optical body, and it is an object to provide an optical body having an excellent degree of polarization and low haze, and a display device including the same.

In addition, an object of the present invention is to provide an optical body having a uniform in-plane optical property and further having excellent optical properties, and a display device including the same.

Technical Solution

In order to solve the above-described problems, the optical body of the present invention may include a substrate and a plurality of dispersions dispersed and included inside the substrate, wherein the plurality of dispersions have an average aspect ratio of 0.5 or less, and the number of dispersions having a cross-sectional area of 0.3 μm² or less is 80% or more of the total dispersions.

According to a preferred exemplary embodiment of the present invention, in the plurality of dispersions, the number of dispersions having a cross-sectional area of 0.3 μm² or less may be 90% or more of the total dispersions.

According to a preferred exemplary embodiment of the present invention, in the plurality of dispersions, the number of dispersions having a cross-sectional area of more than 0.01 μm² to 0.09 μm² or less may be 70% to 90% of the total dispersions.

According to a preferred exemplary embodiment of the present invention, the optical body of the present invention may have a haze of 25% or less.

According to a preferred embodiment of the present invention, the plurality of dispersions may have a cross-sectional dispersion coefficient of 90% to 120% according to Mathematical Formula 2 below.

[Mathematical Formula 2]

$$\text{Cross-sectional dispersion coefficient (\%)} = \frac{\text{Standard deviation of cross-sectional area of dispersion}}{\text{Average cross-sectional area of dispersion}} \times 100$$

Meanwhile, the optical body of the present invention may include a substrate and a plurality of dispersions dispersed and included inside the substrate, and the plurality of dispersions may have an average cross-sectional area of 1 μm² or less and an aspect ratio dispersion coefficient of 40% or more, according to Mathematical Formula 1 below.

[Mathematical Formula 1]

$$\text{Aspect ratio dispersion coefficient (\%)} = \frac{\text{Standard devision of aspect ratio of dispersion}}{\text{Average aspect ratio of dispertion}} \times 100$$

According to a preferred exemplary embodiment of the present invention, the plurality of dispersions may have an aspect ratio dispersion coefficient of 40% to 45% according to Mathematical Formula 1 above.

According to a preferred exemplary embodiment of the present invention, the plurality of dispersions may have an average aspect ratio of 0.3 to 0.5.

According to a preferred exemplary embodiment of the present invention, the optical body of the present invention may satisfy Conditions (1) and (2) below.

(1) Glass transition temperature ($T_g$) of dispersion>Glass transition temperature ($T_g$) of substrate (2) The difference in the glass transition temperatures of a dispersion and a substrate is 10° C. or less.

According to a preferred exemplary embodiment of the present invention, the glass transition temperature ($T_g$) of the substrate may be 110° C. to 130° C.

According to a preferred exemplary embodiment of the present invention, the optical body of the present invention may have a haze of 25% or less.

According to a preferred exemplary embodiment of the present invention, the optical body of the present invention may transmit a first polarized light parallel to a transmission axis and reflect a second polarized light parallel to an extinction axis.

According to a preferred exemplary embodiment of the present invention, the optical body of the present invention may be a polymer dispersion type in which a plurality of dispersions are dispersed inside a substrate.

According to a preferred exemplary embodiment of the present invention, the optical body of the present invention may have a luminance dispersion coefficient of 2% or less according to Mathematical Formula 3 below, which is measured based on an in-plane virtual first line parallel to the transmission axis.

[Mathematical Formula 3]

$$\text{Luminance dispersion coefficient (\%)} = \frac{\text{standard deviation of luminance of samples}}{\text{Average luminance of samples}} \times 100$$

According to a preferred exemplary embodiment of the present invention, the optical body may be stretched in the MD direction, and the first line may be perpendicular to the MD direction.

According to a preferred exemplary embodiment of the present invention, the luminance dispersion coefficient may be 1% or less.

According to a preferred exemplary embodiment of the present invention, the included angle which is an acute angle with the first line may be ±60°, and the luminance dispersion coefficient which is measured based on an in-plane virtual second line passing through a bisecting point of the first line may be within 2%.

According to a preferred exemplary embodiment of the present invention, when the transmission axis direction is the width direction, the width may be 85 cm or more.

According to a preferred exemplary embodiment of the present invention, the plurality of dispersions may be stretched in one uniaxial direction and have different refractive indices in at least one axial direction from the substrate.

According to a preferred exemplary embodiment of the present invention, the plurality of dispersions may be randomly dispersed inside the substrate.

In addition, the display device of the present invention may include the above-mentioned optical body.

In this case, the display device may be preferably a liquid crystal display (LCD) or a light emitting diode (LED).

Hereinafter, terms used in the present specification will be briefly described.

The meaning of 'dispersion has birefringence' is that when light is irradiated to a fiber having a different refractive index depending on the direction, the light incident on the dispersion is refracted by two or more lights in different directions.

The term 'isotropy' means that when the light passes through an object, the refractive index is constant regardless of the direction.

The term 'anisotropy' means that the optical properties of an object are different depending on the direction of light, and anisotropic objects have birefringence and correspond to isotropy.

The term 'light modulation' means that the irradiated light is reflected, refracted, or scattered, or the intensity of the light, the period of the wave, or the nature of the light changes.

The term 'aspect ratio' refers to the ratio of a short axis length with respect to a long axis length based on the vertical cross-section in the longitudinal direction of a dispersion.

The term 'cross-sectional area of a dispersion' is defined by Relationship Formula 1 below.

Cross-sectional area of dispersion ($\mu m^2$)=π×long axis length of dispersion/2×short axis length of dispersion/2   [Relationship Formula 1]

The long axis length and the short axis length of Relationship Formula 1 refer to the long axis and short axis of a dispersion in the cross-section of an optical body perpendicular to the elongating direction of the optical body, based on the vertical cross-section in the longitudinal direction of the dispersion (refer to FIG. 6).

Advantageous Effects

The optical body of the present invention and a display device including the same can not only maximize the luminance enhancement compared to the conventional optical body, but also have an excellent degree of polarization and a low haze.

In addition, the optical body of the present invention and a display device including the same can be widely used in overall display devices such as liquid crystal display devices, organic light emitting display devices, and the like, since the in-plane optical properties are uniform, and furthermore, the optical properties are excellent.

DESCRIPTION OF DRAWINGS

FIG. 1 is a schematic diagram explaining the principle of a conventional optical body.

FIG. 2 is a cross-sectional view of a dual brightness enhancement film (DBEF) currently in use.

FIG. 3 is a perspective view of an optical body including a rod-shaped polymer.

FIG. 4 is a cross-sectional view showing a path of light incident on a birefringent island-in-the-sea yarn used in an optical body.

FIG. 5 is a cross-sectional view of a random dispersion-type optical body according to a preferred embodiment of the present invention.

FIG. 6 is a vertical cross-sectional view in the longitudinal direction of a dispersion used in a random dispersion-type optical body according to a preferred embodiment of the present invention.

FIG. 7 is a perspective view of an optical body included in a preferred embodiment of the present invention.

FIG. 8 is a cross-sectional view of a coat-hanger die, which is a type of flow control units that can be preferably applied to the present invention, and FIG. 9 is a side view of FIG. 8.

FIG. 10 is a cross-sectional view of a liquid crystal display device according to a preferred embodiment of the present invention.

FIG. 11 is a perspective view of a liquid crystal display device employing an optical body according to a preferred embodiment of the present invention.

FIGS. 12 to 14 are mimetic diagrams of sampling of the first and second lines, which are the standards for measuring luminance uniformity, and the specimen to be measured for luminance.

FIG. 15 is a cross-sectional view perpendicular to the stretching direction of an optical body according to an exemplary embodiment of the present invention.

FIG. 16 is a cross-sectional view perpendicular to the stretching direction of a multilayer optical body according to a comparative example of the present invention.

FIG. 17 is an exploded perspective view of a compression spinneret for manufacturing the optical body according to FIG. 16.

MODES OF THE INVENTION

Hereinafter, exemplary embodiments of the present invention will be described in detail with reference to the accompanying drawings such that those skilled in the art to which the present invention pertains can easily practice. The present invention can be implemented in many different forms and is not limited to the exemplary embodiments described herein. In the drawings, parts not relevant to the description are omitted in order to clearly describe the present invention, and the same reference numerals are added to the same or similar constitutional elements throughout the specification.

The optical body of the present invention may be a diffuse polarizer or a reflective polarizer. In addition, it may have various uses as a reflective polarizer, and may be useful for a liquid crystal display panel as a preferred example. In addition, the optical body of the present invention may also be used as a window material, and polarized radiation may be used as a light fixture for a preferred use.

Meanwhile, examples of more specific uses of the optical body of the present invention may include a light-receiving display device such as a liquid crystal display (LCD) or an active display device such as an organic light emitting display, which may be widely used in laptop computers, handheld calculators, digital watches, automotive dashboard displays, polarized luminaires, and work luminaires that use polarized light to increase contrast and reduce glare.

In addition, the optical body of the present invention may be used as a light extractor in various optical devices, including a light guide such as a large core optical fiber (LCOF). Specifically, it may be effectively used in high lighting of buildings, decorative lighting, medical lighting, signages, visual guides (e.g., in aisles or landing strips in airplanes or theaters), displays (e.g., particularly, device displays where excessive heat is a problem), various remote light-source lighting applications such as exhibition lighting, road lighting, automobile lighting, down lighting, work lighting, highlight lighting, and ambient lighting.

The optical body of the present invention may transmit a first polarized light parallel to the transmission axis and reflect a second polarized light parallel to the extinction axis.

First, the first polarized light transmitted by the optical body of the present invention and the second polarized light reflected will be described in detail.

The magnitude of the substantial coincidence or discrepancy of the refractive index of an optical body along the X, Y and Z axes in space affects the degree of scattering of polarized light rays along the axis. In general, the scattering power changes in proportion to the square of the refractive index discrepancy. Therefore, the greater the degree of discrepancy of the refractive index along a particular axis is, the stronger the light rays polarized along the axis are scattered. Conversely, if the discrepancy along a particular axis is small, the light rays polarized along that axis are scattered to a lesser extent. When the refractive index of the isotropic material of an optical body along a certain axis substantially coincides with the refractive index of an anisotropic material, incident light polarized by an electric field parallel to this axis passes through the optical body without scattering. More specifically, the first polarized light (P wave) is transmitted without being affected by the birefringent interface formed at the boundary between the isotropic material and the anisotropic material, but the second polarized light (S wave) is affected by a birefringent interface formed at the boundary between the isotropic material and the anisotropic material such that the modulation of light occurs. Through this, the P wave is transmitted, and the S wave undergoes the modulation of light such as light scattering and reflection of light such that the separation of polarized light occurs, and the first polarized light (P wave) is transmitted through the optical body and reaches a liquid crystal display which is conventionally located on top of the optical body. With this principle, the optical body acts to transmit one polarized light and reflect the other polarized light, and the transmitted polarized light is polarized parallel to the transmission axis, and the reflected polarized light is polarized parallel to the extinction axis.

The optical body of the present invention may be a polymer dispersion-type optical body including a substrate and a plurality of dispersions dispersed and included inside the substrate, and more preferably, it may be a random dispersion-type optical body in which a dispersion is randomly dispersed inside the substrate.

Specifically, the optical body of the present invention may be a polymer dispersion-type optical body 200 provided with a core layer 210 including a substrate 201 and a plurality of dispersions 202 dispersed and included inside the substrate, as illustrated in FIG. 5. In addition, skin layers 210 and 220 may be further provided on one or both surfaces of the core layer 210, and specifically, on one or both surfaces of the substrate 201.

In addition, the dispersion 202 may be a random dispersion-type optical body, which is randomly dispersed inside a substrate on the cross-section of the optical body perpendicular to the longitudinal direction of a plurality of dispersions, as illustrated in FIG. 5. Alternatively, as shown in FIG. 15, it may be a form which is uniformly arranged on the cross-section of an optical body perpendicular to the longitudinal direction of a plurality of dispersions, for example, a form in which dispersions having the same thickness are arranged in a horizontal direction at the same height of the cross-section. Preferably, the plurality of dispersions 202 may be randomly dispersed inside the substrate. Through this, problems such as light leakage, bright line viewing, and the like may be minimized or prevented, compared to conventional optical bodies, and at the same time, it may be advantageous to express optical properties such as very good luminance, degree of polarization, and the like In this case, since the dispersion must form a birefringent interface with the substrate to induce a light modulation effect, when the substrate is optically isotropic, the dispersion may have optical birefringence, and conversely, when the substrate has optical birefringence, the dispersion may have optical isotropy. Specifically, when the refractive index in the x-axis direction of the dispersion is $nX_1$, the refractive index in the y-axis direction is $nY_1$, the refractive index in the z-axis direction is $nZ_1$, and the refractive index of the substrate is $nX_2$, $nY_2$, and $nZ_2$, in-plane birefringence may occur between $nX_1$ and $nY_1$. More preferably, at least any one of the X, Y, and Z axis refractive indices of the substrate and the dispersion may be different, and more preferably, when the elongation axis is the X axis, the difference in refractive indices with respect to the Y and Z axis directions may 0.05 or less, and the difference in the refractive indices with respect to the X-axis direction may be 0.1 or more. Meanwhile, if the difference in the refractive indices is 0.05 or less, it is conventionally interpreted as a match.

The plurality of dispersions of the present invention may have an appropriate optical thickness to reflect the desired second polarized light in at least the visible light wavelength range, and may have a thickness deviation within an appropriate range. The optical thickness means that n (refractive index)>d (physical thickness). Meanwhile, the wavelength of light and the optical thickness are defined according to Relationship Formula 2 below.

$$\lambda = 4nd, \text{ provided that } \lambda \text{ is the wavelength of light (nm), n is the refractive index, and d is the physical thickness (nm)} \quad [\text{Relationship Formula 2}]$$

Therefore, when the average optical thickness of the dispersion is 150 nm, the second polarized light having a 400 nm wavelength may be reflected by Relationship Formula 2, and when adjusting the optical thicknesses of each of the plurality of dispersions with this principle, it is possible to significantly increase the reflexibility of the second polarized light in the desired wavelength range, particularly in the visible light wavelength range.

Accordingly, in the optical body of the present invention, preferably, at least two of the plurality of dispersions may have different cross-sectional areas in the direction in which the dispersion is elongated, and through this, the cross-sectional diameter (corresponding to the optical thickness) of the dispersion may be different. Thus, the second polarized light having a wavelength corresponding to the optical thickness may be reflected, and when a polymer having an optical thickness corresponding to each wavelength of visible light is included, the second polarized light corresponding to the visible light region may be reflected.

In addition, the shape of the plurality of dispersions of the present invention is not particularly limited, and may specifically be circular, elliptical, and the like, and the total number of dispersions may be 25,000,000 to 80,000,000, when the thickness of the substrate is 120 μm based on 32 inches, but is not limited thereto.

Meanwhile, the substrate and the dispersion of the present invention may be used without limitation as long as these are materials that are conventionally used to form a birefringent interface in an optical body, and the substrate component may preferably include one or more selected from the group consisting of polyethylene naphthalate (PEN), co-polyethylene naphthalate (co-PEN), polyethylene terephthalate (PET), polycarbonate (PC), polycarbonate (PC) alloy, polystyrene (PS), heat-resistant polystyrene (PS), polymethyl methacrylate (PMMA), polybutylene terephthalate (PBT), polypropylene (PP), polyethylene (PE), acrylonitrile butadiene styrene (ABS), polyurethane (PU), polyimide (PI), polyvinyl chloride (PVC), styrene acrylonitrile (SAN), ethylene vinyl acetate (EVA), polyamide (PA), polyacetal (POM), phenol, epoxy (EP), urea (UF), melanin (MF), unsaturated polyester (UP), silicone (SI), polycyclohexylene dimethylene terephthalate (PCTG), and cycloolefin polymer, and more preferably, it may include polycarbonate (PC) and polycyclohexylene dimethylene terephthalate (PCTG). In this case, polycyclohexylene dimethylene terephthalate is a compound prepared by polymerization of an acid component and a diol component at a molar ratio of 1:0.5 to 1.5, and preferably, at a molar ratio of 1:0.8 to 1.2. In addition, the acid component may include terephthalate, and the diol component may include ethyl glycol and cyclohexanedimethanol. In addition, the substrate component may be a material having a glass transition temperature of 110° C. to 130° C., and preferably, 115° C. to 125° C.

In addition, the dispersion component may be preferably used alone with or by mixing polyethylene naphthalate (PEN), co-polyethylene naphthalate (co-PEN), polyethylene terephthalate (PET), polycarbonate (PC), polycarbonate (PC) alloy, polystyrene (PS)), heat-resistant polystyrene (PS), polymethyl methacrylate (PMMA), polybutylene terephthalate (PBT), polypropylene (PP), polyethylene (PE), acrylonitrile butadiene styrene (ABS), polyurethane (PU)), polyimide (PI), polyvinyl chloride (PVC), styrene acrylonitrile (SAN), ethylene vinyl acetate (EVA), polyamide (PA), polyacetal (POM), phenol, epoxy (EP), urea (UF), melanin (MF), unsaturated polyester (UP), silicone (SI), polycyclohexylene dimethylene terephthalate (PCTG), and a cycloolefin polymer, and more preferably, it may include polyethylene naphthalate (PEN).

Meanwhile, for polyethylene naphthalate (PEN), by-products may occur in the process of polymerization. The less the by-products are generated, the more excellent the degree of polymerization of polyethylene naphthalate (PEN) is, and the dispersion component of the present invention may preferably include polyethylene naphthalate (PEN) having an excellent degree of polymerization. In this case, by-products may be a residual catalyst, polyethylene glycol (PEG), and the like used in the polymerization process, and the dispersion component of the present invention may include polyethylene naphthalate (PEN), in which the content of the residual catalyst (e.g., Ge) is 100 ppm or less, preferably, 10 ppm to 70 ppm, and more preferably, 10 ppm to 40 ppm, and the content of diethylene glycol (DEG) is 3.5 wt. % or less, preferably, 1.0 wt. % to 2.5 wt. %, and more preferably, 1.0 wt. % to 2.0 wt. %.

In addition, polyethylene naphthalate (PEN) may have a glass transition temperature of 110° C. to 125° C. depending on process conditions or the molar ratio of monomers during a polymerization process, and polyethylene naphthalate (PEN) used in the present invention may have a glass transition temperature of 115° C. to 125° C., preferably, 115° C. to 125° C., and more preferably, 118° C. to 122° C.

Furthermore, the optical body of the present invention may satisfy Conditions (1) and (2) below.

(1) Glass transition temperature ($T_g$) of dispersion>Glass transition temperature ($T_g$) of substrate (2) The difference in the glass transition temperatures of a dispersion and a substrate is 10° C. or less.

By satisfying Conditions (1) and (2), the optical body of the present invention may be more advantageous to achieve excellent physical properties.

In addition, the optical body of the present invention may be stretched in at least one direction to form a birefringent interface between the substrate and the dispersion.

In addition, the plurality of dispersions of the present invention may be randomly dispersed inside the substrate. Through this, the optical body of the present invention may be more easily implemented to express excellent physical properties, and optical bodies that compensate for problems such as light leakage, bright light viewing, and the like may be implemented compared to conventional optical bodies.

In addition, when the optical body of the present invention, specifically, the random dispersion-type optical body is described in more detail, the random dispersion-type optical body may include a substrate and a plurality of dispersions inside the substrate for transmitting a first polarized light emitted from the outside and reflecting a second polarized light. In addition, the plurality of dispersions may have different refractive indices in at least one axial direction from the substrate, and the plurality of dispersions included inside the substrate may have an average aspect ratio (≒ an average aspect ratio of the short axis length with respect to the long axis length based on a vertical cross-section in the longitudinal direction) of 0.5 or less, preferably, 0.3 to 0.5, more preferably, 0.4 to 0.48, and even more preferably, 0.44 to 0.46. In the case of such an optical body, it may be more advantageous to achieve excellent physical properties.

Meanwhile, the plurality of dispersions of the present invention may have an average cross-sectional area of 1 μm$^2$ or less, preferably, 0.5 μm$^2$ or less, and more preferably, 0.3 μm$^2$ or less.

In addition, in the plurality of dispersions of the present invention, the number of dispersions having a cross-sectional area of 0.3 μm$^2$ or less may be 80% or more of the total dispersions, preferably, the number of dispersions having a cross-sectional area of 0.3 μm$^2$ or less may be 90% or more of the total dispersions, and more preferably, the number of dispersions having a cross-sectional area of 0.3 μm$^2$ or less may be 95% or more of the total dispersions.

In addition, more specifically, in the plurality of dispersions of the present invention, the number of dispersions having a cross-sectional area of 0.21 µm² or less may be 80% or more of the total dispersions, preferably, the number of dispersions having a cross-sectional area of 0.21 µm² or less may be 90% or more of the total dispersions, and more preferably, the number of dispersions having a cross-sectional area of 0.21 µm² or less may be 95% or more of the total dispersions.

In addition, even more specifically, in the plurality of dispersions of the present invention, the number of dispersions having a cross-sectional area of 0.12 µm² or less may be 80% or more of the total dispersions, preferably, the number of dispersions having a cross-sectional area of 0.12 µm² or less may be 85% or more of the total dispersions, and more preferably, the number of dispersions having a cross-sectional area of 0.12 µm² or less may be 93% or more of the total dispersions, and in the case of such an optical body, it may be more advantageous to achieve excellent physical properties.

In addition, in the plurality of dispersions of the present invention, the number of dispersions having a cross-sectional area of more than 0.01 µm² or 0.09 µm² less may be 70% to 90% of the total dispersions, preferably, 75% to 85%, and more preferably, 78% to 82% of the total dispersions, and in the case of such an optical body, it may be more advantageous to achieve excellent physical properties.

Meanwhile, the plurality of dispersions of the present invention may have a cross-sectional dispersion coefficient of 90% to 120%, preferably 95 to 115%, and more preferably, 97 to 105% according to Mathematical Formula 2 below, and in the case of such an optical body, it may be more advantageous to achieve excellent physical properties.

[Mathematical Formula 2]

Cross-sectional dispersion coefficient (%) =

$$\frac{\text{Standard deviation of cross-sectional area of dispersion}}{\text{Average cross-sectional area of dispersion}} \times 100$$

After all, the cross-sectional dispersion coefficient is a parameter that can confirm the degree of dispersion of a cross-sectional area. If the cross-sectional area dispersion coefficient is 0%, it means that it is the same, and as it increases, it means that the difference in the cross-sectional area between dispersions or the ratio of the dispersions having a larger difference in the cross-sectional areas than the average cross-sectional area is increased.

As the optical body of the present invention has a very large dispersion coefficient of 90% or more for a cross-sectional area, it is composed of 80% or more of those having a cross-sectional area of 0.3 or less. As the cross-sectional area distribution between the dispersions becomes very wide, there is an advantage that the luminance may be improved more significantly by subdividing and covering all of the desired wavelength ranges.

Furthermore, the plurality of dispersions of the present invention may have an aspect ratio dispersion coefficient of 40% or more, preferably, 40% to 45%, and more preferably, 41% to 43%, according to Mathematical Formula 1 below, and in the case of such an optical body, it may be more advantageous to achieve excellent physical properties.

[Mathematical Formula 1]

Aspect ratio dispersion coefficient (%) =

$$\frac{\text{Standard devision of aspect ratio of dispersion}}{\text{Average aspect ratio of dispertion}} \times 100$$

Meanwhile, the haze of the random dispersion-type optical body of the present invention may be 25% or less, and preferably, 10% to 20%.

Furthermore, the optical body of the present invention may form a birefringent interface between the substrate and the dispersion, and the dispersion may be stretched in at least any one direction in order to have an appropriate optical thickness. As one example, it may be stretched in at least one direction, and as one example, when stretched in the uniaxial direction, the uniaxial direction may be an MD direction conveyed while the optical body is continuously manufactured. Further, the uniaxial direction may be a longitudinal direction that is a long axis direction of the dispersion shape.

Meanwhile, when the polymer dispersion type in the form of the optical body of the present invention is described, it is a type of a well-known optical body along with a multilayered optical body, in which the optical layer of a flat plate formed of an optically isotropic material and the optical layer of a flat plate formed of an optically anisotropic material are alternately laminated with each other. However, in the polymer dispersion-type optical body, the effect by the direction of force or the difference of force received by each of a plurality of dispersions when any one material of an optically isotropic material or an optically anisotropic material is expanded in one direction as the other material is dispersed and accommodated as a plurality of dispersion may be significantly greater compared to the multilayered optical body, which is a structure in which the layers of a plate are alternately laminated. As a result, in the case of a multilayered optical body, there is a little risk of occurrence of variation in optical properties due to elongation in one direction, for example, luminance variation by position, but in the case of a polymer dispersion-type optical body, there is a high risk of variation in luminance by position. In particular, if the direction of elongation is the x-axis among the directions perpendicular to the direction of stretching, for example, the x-axis and y-axis perpendicular to the plane, there is a problem in that the deviation for each position in the TD direction which is vertical thereto is remarkable large. In addition, as the length of the optical body to be manufactured increases in the width direction, this problem may become larger.

As a result of repeated studies to solve this problem, the present inventors found out that this problem also affects impurities in the material forming an optical body, that is, catalysts and by-products used in the process of manufacturing the material, and as the size of the dispersion becomes larger, the distribution of the dispersions in the cross-section of the optical body perpendicular to the elongation direction is more random, and the problem of luminance non-uniformity becomes larger. In addition, it was found that it was greatly affected by the length of the width of an ejected optical body, the smoothing process after ejection, the process of elongation in one direction afterwards (e.g., stretching process), and/or the design and/or control of the designed conditions of the process conditions in the subsequent heat setting process, and the like. Specifically, it may be due to the diameter of a roller that may be used in the smoothing process, surface non-uniformity, non-uniformity of the stretching speed in the stretching process, improper temperature of the stretching process and the heat setting step, and uneven treatment of heat.

The present inventors have made great efforts to control the above factors that may affect the luminance non-uniformity, and as a result, even though it is a polymer dispersion-type optical body, a reflective polarizing film having a luminance dispersion coefficient of 2% or less measured based on an in-plane virtual first line parallel to the transmission axis was implemented.

When it is described by referring to FIG. 12, luminance measured based on an in-plane virtual first line (l) parallel to the transmission axis (q) of the optical body 100 refers to the luminance of a specimen having a predetermined size at the center point on the first line (l). The transmission axis (b) may be a vertical direction of the stretched direction, or may be a TD direction when stretched in the MD direction. In addition, the specimen may have a circular shape or a polygonal shape such as a square or a rectangle. In addition, as one example, the size of the specimen may be 1 cm×1 cm, 4 cm×4 cm, 10 cm×10 cm, and the like based on a square, but is not limited thereto, and it may be established in consideration of the length (e.g., the length of the width) in a direction parallel to the transmission axis (b) of the optical body 100.

In addition, the luminance dispersion coefficient refers to the calculated result value using the average luminance and the luminance standard deviation calculated through luminances measured for each of five samples having the same shape and the same size with the center point on the first line (l) according to Mathematical Formula 3 below. In this case, for the sample, two samples ($S_L$ and $S_R$) are sampled in each direction of the left and right directions, centering on a first sample ($S_1$) in which the point at which the first line (l) is vertically bisected is the center of gravity of the sample, and these are sampled such that the distance between neighboring samples is the same. When it is described by referring to FIGS. 12 and 14, the distance between the samples refers to the distance (s) between neighboring sides of the sample, and as long as the distance between the samples is the same, the distance between the samples may be 0.

[Mathematical Formula 3]

$$\text{Luminance dispersion coefficient (\%)} = \frac{\text{standard deviation of luminance of samples}}{\text{Average luminance of samples}} \times 100$$

After all, the luminance dispersion coefficient is a parameter that may confirm the luminance non-uniformity between each sample. If the luminance dispersion coefficient is 0%, it means that there is no luminance difference between each sample, and it means that as the luminance dispersion coefficient becomes large, the luminance difference between each sample becomes large. The optical body according to the present invention has very excellent luminance uniformity as the luminance dispersion coefficient calculated by Mathematical Formula 3 is 2% or less, preferably, 1% or less, and even more preferably, 0.5% or less. If the luminance dispersion coefficient is more than 2%, an unintended difference in contrast and the like may occur on a 32-inch or larger display, resulting in significant deterioration of image quality, and there is a concern that it will not be commercialized because it is difficult to secure the uniformity quality standard of 85% or more. In addition, when the dispersion coefficient is more than 2%, the haze of the optical body may be significantly increased or the haze may be non-uniform for each position. In addition, optical properties may be deteriorated, such as a decrease in luminance and the like, and there is a concern that a thickness deviation of the optical body may occur, or appearance quality may also be remarkably deteriorated such as wrinkles, swelling phenomena, and the like.

The optical body having a luminance dispersion coefficient of 2% or less may be implemented by, for example, improving the degree of polymerization of a material forming a dispersion or controlling impurities. Specifically, the residual amount of a polymerization catalyst as an impurity in the substrate and/or dispersion may be 150 ppm or less, and more preferably, 100 ppm or less. When it is described by assuming the dispersion to be PEN, the residual amount of a Ge catalyst, which is a polymerization catalyst, may be 200 ppm or less, preferably 100 ppm or less, and more preferably 10 ppm to 70 ppm. In addition, the content of diethylene glycol (DEG), which is a naturally occurring by-product in the polymerization process, may be 4.0 wt. % or less, preferably, 3.5 wt. % or less, and more preferably, 1.0 wt. % to 2.0 wt. %.

As another example, a roll having a uniform diameter in the film width direction may be used in the smoothing process of an ejected film during the manufacturing process. As still another example, it is preferable to control the stretching rate uniformity within ±3% based on a predetermined stretching rate in the stretching process during the manufacturing process.

As another example, when stretching in the MD direction in the stretching step, a predetermined force may be constantly applied in the TD direction. When a predetermined force is applied in the TD direction, a force may be preferably applied so as to stretch at a level of 1:1 to 1:1.2 in the TD direction. In this case, if it is stretched in the TD direction by more than 1:1.2, optical properties such as the degree of polarization, luminance, and the like may be significantly deteriorated, and if it is stretched by less than 1:1, it may not be easy to achieve luminance uniformity.

According to a preferred exemplary embodiment of the present invention, the included angle which is an acute angle with the first line may be ±60°, and the luminance dispersion coefficient which is measured based on an in-plane virtual second line passing through a bisecting point of the first line may be 2% or less, more preferably, 1% or more, and even more preferably, 0.5% or less. The luminance non-uniformity problem is remarkable in a direction parallel to the transmission axis, for example, a direction perpendicular to the elongated direction, for example, in the TD direction, and for example, in the width direction, and furthermore, it may be remarkable along the first line and a predetermined angle, in particular, along the second line forming ±60° with the first line. In addition, these characteristics may increase the problem of luminance non-uniformity as the width of a reflective polarizing film becomes larger and the arrangement of the dispersion is random.

When it is described by referring to FIGS. 13 and 14, the second line (m and m') passes through the center point that bisects a virtual first line (l) in the optical body 100, and it means a line segment in which the angle of the acute angle formed by the first line (l) is ±60°.

Meanwhile, the meaning of the luminance measured based on the second line (m or m') is the same as the luminance measured based on the first line (l) described above, and it is measured in the same manner. In addition, the luminance uniformity may also be a result value of the sample being sampled, measured, and calculated in the same manner. When the sampling method of samples is specifically described, sampling is performed for seven samples (SF, SB) in each direction forward and backward, centering on the first sample (S1) having a point at which the first line (l) is vertically bisected as the center point, but these are sampled such that the distance between neighboring samples is 50 mm, and in this case, the distance between samples means the shortest distance (s) between neighboring sides or vertices of the sample.

When the optical body satisfies not only the luminance characteristics based on the first line according to the present invention, but also the luminance characteristics based on the second line, it is possible to obtain improved luminance uniformity as well as higher haze uniformity, and thus, there is an advantage that excellent luminance characteristics may be exhibited.

When the dispersion size of the optical body of a preferred example of the present invention is described in detail, for 80% or more of a plurality of dispersions 201 dispersed inside a substrate 201, the aspect ratio of the short axis length with respect to the long axis length should be ½ or less based on the vertical cross-section in the longitudinal direction, and more preferably, 90% or more may satisfy the aspect ratio value of 0.5 or less. As illustrated in FIG. 6, the aspect ratio is the longitudinal direction of a dispersion, that is, as one example, the MD direction, and/or as one example, when the long axis length is a and the short axis length is b in the cross-section of the dispersion in the vertical cross-section of a reflective polarizing film perpendicular to the elongation direction, the ratio (aspect ratio) of the relative length of the long axis length (a) and the short axis length (b) must be 0.5 or less. In other words, when the long axis length (a) is 2, the short axis length (b) should be less than or equal to 1. If the dispersion having an aspect ratio of 0.5 or less is less than 80%, it is difficult to achieve the desired optical properties. In addition, the number of dispersions having a cross-sectional area of 0.3 μm² or less in the plurality of dispersions may be 65% or more of the total dispersions.

Furthermore, the random dispersion-type optical body of the present invention is included in the above-described substrate and the inside of the substrate, and the optical body including a plurality of dispersions satisfying the dispersion conditions according to the above-described preferred embodiment may be used as a core layer, and may have a structure including an integrated skin layer formed on at least one surface of the core layer. In addition, by further providing a skin layer, it may contribute to the protection of the core layer and the improvement of the reliability of the optical body.

The optical body according to an embodiment that does not include a skin layer and the optical body according to another embodiment that includes a skin layer may be different in terms of use, and it may be preferable to use an optical body including a skin layer in various general-purpose liquid crystal displays such as displays and the like. Also, in the case of portable liquid crystal display devices, for example, portable electronic devices, smart electronic devices, and smartphones, it may be preferable to use an optical body that does not include a skin layer as a slim optical body is required, but is not limited thereto.

Specifically, FIG. 5 is a cross-sectional view of the random dispersion-type optical body of the present invention, and a core layer 210 in which a plurality of dispersions 202 are randomly distributed and arranged inside the substrate 201 and a skin layer 220 integrally formed on at least one surface of the core layer are shown.

First, when the core layer 210 is described, the core layer may have an average aspect ratio (≈the average aspect ratio of the short axis length with respect to the major axis length based on the vertical cross-section in the longitudinal direction) of 0.5 or less, preferably, 0.3 to 0.5, more preferably, 0.4 to 0.48, and even more preferably, 0.44 to 0.46.

Specifically, FIG. 6 is a vertical cross-sectional view in the longitudinal direction of a dispersion used in a preferred embodiment of the present invention, and when the long axis length is a and the short axis length is b, the average of the ratio (aspect ratio) of the relative lengths of the long axis length (a) and short axis length (b) should be 0.5 or less, preferably, 0.3 to 0.5, more preferably, 0.4 to 0.48, and even more preferably, 0.44 to 0.46. If the ratio of the short axis length with respect to the long axis length does not satisfy 0.5 or less, it is difficult to achieve the desired optical properties.

FIG. 7 is a perspective view of an optical body included in a preferred embodiment of the present invention, and a plurality of random dispersions 208 are elongated in the longitudinal direction inside the substrate 201 of the core layer 210, and the skin layer 220 may be formed above and/or below the core layer 210. In this case, the random dispersions 208 may be elongated in various directions, respectively, but it is advantageous to elongate in parallel in any one direction, and more preferably, it is effective to maximize the light modulation effect if it is elongated parallel between elongating bodies in a direction perpendicular to the light irradiated from an external light source.

In addition, the thickness of a core layer may be preferably 20 μm to 350 μm, and more preferably, 50 μm to 250 μm, but is not limited thereto, and the thickness of the core layer may be designed differently depending on the specific use, whether the skin layer is included, and the thickness of the skin layer. In addition, the total number of dispersions may be 25,000,000 to 80,000,000, when the thickness of the substrate is 120 μm based on 32 inches, but is not limited thereto.

Next, when the skin layer 220 that may be included on at least one surface of the core layer is described, a component that is conventionally used may be used for the skin layer component, and it may be used without limitation as long as it is conventionally used in a reflective polarizing film and may preferably include one or more selected from polyethylene naphthalate (PEN), co-polyethylene naphthalate (co-PEN), polyethylene terephthalate (PET), polycarbonate (PC), polycarbonate (PC) alloy, polystyrene (PS), heat-resistant polystyrene (PS), polymethyl methacrylate (PMMA), polybutylene terephthalate (PBT), polypropylene (PP), polyethylene (PE), acrylonitrile butadiene styrene (ABS), polyurethane (PU), polyimide (PI), polyvinyl chloride (PVC), styrene acrylonitrile (SAN), ethylene vinyl acetate (EVA), polyamide (PA), polyacetal (POM), phenol, epoxy (EP), urea (UF), melanin (MF), unsaturated polyester (UP), silicone (SI), polycyclohexylene dimethylene terephthalate (PCTG), and cycloolefin polymer, and more preferably, it may include polycarbonate (PC) and polycyclohexylene dimethylene terephthalate (PCTG). In this case, polycyclohexylene dimethylene terephthalate is a compound prepared by polymerizing an acid component and a diol component at a molar ratio of 1:0.5 to 1.5, and preferably, 1:0.8 to 1.2, and the acid component may include terephthalate, and the diol component may include ethyl glycol and cyclohexanedimethanol.

The thickness of the skin layer may be 30 μm to 500 μm, but is not limited thereto.

In addition, the width of the optical body may be 85 cm or more based on when it is manufactured. The width may be a length in the direction of the transmission axis, and the optical body according to the present invention has an advantage of ensuring luminance uniformity in a corresponding direction, even though it is only formed by a large area with a width of 85 cm or more.

In addition, the optical body according to a preferred exemplary embodiment of the present invention that satisfies the above-described luminance uniformity may have a haze of 30% or less, more preferably, 25% or less, even more preferably, 22% or less, and even more preferably, 20% or less. In addition, the haze uniformity along the first line measured by the same sampling method of samples as the measurement method of luminance uniformity may be 3% or less, more preferably 2% or less, and even more preferably 1% or less. In addition, as a uniform thickness is secured, a difference in the percentages of thickness measured and calculated by the experimental method described below for the sampled sample may be within 1%.

Meanwhile, when the skin layer is formed, it is integrally formed between the core layer 210 and the skin layer 220. As a result, it is possible not only to prevent deterioration of the optical properties due to the adhesive layer, but also to add more layers in a limited thickness, thereby significantly improving the optical properties. Furthermore, since the skin layer is manufactured at the same time as the core layer and then the stretching process is performed, the skin layer of the present invention may be stretched in at least one axial direction, unlike when the unstretched skin layer is adhered after stretching the core layer in the related art. Through this, surface hardness is improved compared to the unstretched skin layer, thereby improving scratch resistance and enhancing heat resistance.

Meanwhile, the optical body according to the present invention may further include a structured surface layer integrally at the upper or lower part of the above-described optical body, such as microlens, lenticular, prism shape, and the like for changing the path of light such as condensing or diffusion. For description thereon, Korean Patent Application No. 2013-0169215 and Korean Patent Application No. 2013-0169217 by the same applicant may be incorporated herein by reference.

The optical body in which the above-described dispersion is randomly dispersed inside the substrate may be manufactured through a manufacturing method described below. However, it is not limited thereto.

First, the substrate component and the dispersion component may be separately supplied to independent extrusion units, in which case the extrusion unit may be constituted by two or more. Also included in the present invention is that polymers are supplied to one extrusion unit including a separate supply path and a distribution port so as not to be mixed. The extrusion unit may be an extruder, which may further include a heating means and the like to convert the solid-phase supplied polymers into a liquid phase. In this case, the substrate component or the dispersion component may be advantageous in expressing luminance uniformity only when the content of impurities is less than a certain level.

Meanwhile, the viscosity is designed to be different such that there is a difference in polymer flowability so that the dispersion component may be arranged inside the substrate component, and preferably, the substrate component has better flowability than the dispersion component. Next, as the substrate component and the dispersion component pass through a mixing zone and a mesh filter zone, an optical body in which the dispersion is randomly arranged inside the substrate may be manufactured through a difference in viscosity of the dispersion component inside the substrate.

Additionally, when a skin layer is included on at least one surface of the manufactured optical body, the skin layer component transferred from the extrusion unit is laminated on at least one surface of the optical body. Preferably, the skin layer component may be laminated on both sides of the optical body. When the skin layers are laminated on both sides, the material and thickness of the skin layers may be identical or different from each other.

Next, it is possible to induce spreading in the flow control unit such that the dispersion components included inside the substrate may be randomly arranged. Specifically, FIG. 8 is a cross-sectional view of a coat-hanger die, which is a type of a preferred flow control unit applicable to the present invention, and FIG. 9 is a side view of FIG. 8. Through this, the size and arrangement of the cross-sectional area of the dispersion component may be randomly controlled by appropriately controlling the degree of spreading of the substrate. In FIG. 8, since the substrate on which the skin layer transferred through the flow path is spread widely from left to right in the coat-hanger die, the dispersion component included therein may also spread widely from left to right.

According to a preferred embodiment of the present invention, cooling and smoothing the optical body from which the spreading is induced by the flow control unit; stretching the optical body through the smoothing step; and heat setting the stretched optical body may be further included.

First, as a step of cooling and smoothing the optical body transferred from the flow control unit, it may be subjected to cooling which is used in the manufacture of a conventional optical body and solidified, and then, smoothing may be performed through a casting roll process or the like. In this case, the roll to be used may preferably be used that has a uniform diameter, and through this, there is an advantage that luminance uniformity may be easily secured.

Afterwards, a process of stretching the optical body that has undergone the smoothing step is performed.

The stretching may be performed through a stretching process of a conventional optical body, and through this, a difference in refractive indices between the substrate component and the dispersion component may be induced, thereby causing a light modulation phenomenon at the interface, and the first component (dispersion component) induced to spread is further reduced in the aspect ratio through stretching. To this end, the stretching process may preferably perform uniaxial stretching or biaxial stretching, and more preferably, it may perform uniaxial stretching.

In the case of uniaxial stretching, stretching may be performed in the longitudinal direction of a first component. For example, the longitudinal direction may be the MD direction. In addition, the stretching ratio may be 3 times to 12 times. Meanwhile, methods for changing the isotropic material to birefringence are conventionally known and, for example, when stretching under appropriate temperature conditions, the dispersion molecules are oriented such that the material may be birefringent. In this case, it may be easy to ensure luminance uniformity in a direction parallel to the transmission axis by controlling the stretching rate uniformly, by fixing the TD direction of the optical body that is conveyed in the MD direction and stretched with a clip, tongs, or the like, or by applying a predetermined force and stretching.

Next, the final optical body may be manufactured through heat setting the stretched optical body. The heat setting may be heat-set through a conventional method, and preferably, it may be performed through an IR heater at 180° C. to 200° C. for 0.1 minutes to 3 minutes. In this case, heat setting may be easy to ensure luminance uniformity in a direction parallel to the transmission axis by applying heat at the same level regardless of the position of the optical body.

The optical body of the present invention described above may be employed in a light source assembly, a display device, or the like, and may be used to improve light efficiency. The light source assembly may be an assembly conventionally employed in work lights, lighting, or liquid crystal displays. The light source assembly employed in the liquid crystal display device is classified into a direct type in which the lamp is located at the bottom, an edge type in which the lamp is located at the side, and the like, and the optical body according to embodiments of the present invention may be employed in any type of light source assemblies. In addition, it is applicable to a backlight assembly disposed on the bottom of the liquid crystal panel or a front light assembly disposed on the top of the liquid crystal panel.

In addition, the optical body of the present invention may be employed in an active light emitting display such as an organic light emitting display device. In this case, the optical body may be employed in front of the panel of an organic light emitting display device to improve a contrast ratio, enhance visibility, and the like.

Hereinafter, as an example of various application examples, a case in which an optical body is applied to a liquid crystal display device including an edge-type light source assembly is illustrated.

FIG. 10 is a cross-sectional view of a liquid crystal display device according to a preferred embodiment of the present invention, and the liquid crystal display device 2700 includes a backlight unit 2400 and a liquid crystal panel assembly 2500.

The backlight unit 2400 includes an optical body 2111 that modulates the optical characteristics of emitted light, and in this case, other components included in the backlight unit and the positional relationship between the other components and the optical body 2111 may vary depending on the purpose, and thus, it is not particularly limited in the present invention.

However, according to a preferred embodiment of the present invention, as shown in FIG. 10, a light source 2410, a light guide plate 2415 for guiding light emitted from the light source 2410, a reflective film 2320 disposed under the light guide plate 2415, and an optical body 2111 disposed on the light guide plate 2415 may be configured and positioned.

In this case, the light source 2410 is disposed on both sides of the light guide plate 2415. For the light source 2410, for example, a light emitting diode (LED), a cold cathode fluorescent lamp (CCFL), a hot cathode fluorescent lamp (HCFL), or an external electrode fluorescent lamp (EEFL) may be used. In other exemplary embodiments, the light source 2410 may be disposed only on one side of the light guide plate 2415.

The light guide plate 2415 moves light emitted from the light source 2410 through total internal reflection, and then emits light upward through a scattering pattern and the like formed on the bottom surface of the light guide plate 2415. A reflective film 2420 is disposed under the light guide plate 2415 to reflect light emitted downward from the light guide plate 2415 upward.

The optical body 2111 is disposed on the light guide plate 2415. Since the optical body 2111 has been described above in detail, duplicate description is omitted. Other optical sheets may be further disposed above or below the optical body 2111. For example, a liquid crystal film partially reflecting the incident circularly polarized light, a phase-difference film for converting circularly polarized light into linearly polarized light, and/or a protective film may be further installed.

In addition, the light source 2410, the light guide plate 2415, the reflective film 2420, and the optical body 2111 may be accommodated by a bottom chassis 2440.

The liquid crystal panel assembly 2500 includes a first display panel 2511, a second display panel 2512, and a liquid crystal layer (not illustrated) interposed therebetween, and a polarizing plate (not illustrated) attached to the surfaces of the first display panel 2511 and the second display panel 2512 may be further included.

The liquid crystal display 2700 may further include a top chassis 2600 covering an edge of the liquid crystal panel assembly 2500 and surrounding side surfaces of the liquid crystal panel assembly 2500 and the backlight unit 2400.

Meanwhile, specifically, FIG. 11 is an example of a liquid crystal display device employing an optical body according to a preferred embodiment of the present invention, in which a reflecting plate 3280 is inserted on a frame 3270, and a cold cathode fluorescent lamp 3290 is positioned on the upper surface of the reflecting plate 3280. An optical film 3320 is located on the upper surface of the cold cathode fluorescent lamp 3290, and the optical film 3320 may be laminated in the order of a diffusion plate 3321, an optical body 3322, and an absorption polarizing film 3323. However, the components included in the optical film and the laminating order between the components may vary depending on the purpose, and some components may be omitted or provided in a plurality. Furthermore, a phase-difference film (not illustrated) or the like may also be inserted at an appropriate position in the liquid crystal display device. Meanwhile, a liquid crystal display panel 3310 may be positioned on the upper surface of the optical film 3320 to be fitted into a mold frame 3300.

Looking at the light path as a center, light irradiated from the cold cathode fluorescent lamp 3290 reaches the diffusion plate 3321 in the optical film 3320. Light transmitted through the diffusion plate 3321 passes through the optical body 3322 in order to propagate the light traveling direction vertically with respect to the optical film 3320, thereby causing light modulation. Specifically, the P wave transmits the optical body without loss, but in the case of the S wave, light modulation (reflection, scattering, refraction, etc.) occurs, and it is reflected by a reflector 3280 again, which is the back side of the cold cathode fluorescent lamp 3290. After the properties of light are randomly changed to the P wave or S wave, it passes through the optical body 3322 again. Then, after passing through an absorption polarizing film 3323, it reaches the liquid crystal display panel 3310. Meanwhile, the cold cathode fluorescent lamp 3290 may be replaced with LED.

In the embodiments described above, by applying an optical body according to embodiments of the present invention, there are advantages that a plurality of light modulation characteristics may be effectively exhibited, luminance may be improved, and light leakage and bright lines do not occur, and it may prevent appearance defects in which foreign substances appear on the exterior, and at the same time, it is possible to ensure the reliability of the optical body even in a high temperature and high humidity environment where a liquid crystal display is used. In addition, the micropattern layer and the light-collecting layer having respective functions are integrated into the optical body, thereby reducing the thickness of the light source assembly. In addition, the assembly process may be simplified, and the image quality of the liquid crystal display device including such a light source assembly may be improved.

Meanwhile, in the present invention, the use of the optical body has been mainly described for liquid crystal displays, but is not limited thereto, and it can be widely used in flat panel display technologies such as projection displays, plasma displays, field emission displays, and electroluminescent displays.

In the above, the present invention has been mainly described with reference to embodiments, but these are merely examples and do not limit the embodiments of the present invention, and those of ordinary skill in the art to which the exemplary embodiments of the present invention pertain will appreciate that various modifications and applications not illustrated above are possible without departing from the essential characteristics of the present invention. For example, each constitutional element specifically shown in the embodiments of the present invention can be implemented by modification. In addition, differences related to these modifications and applications should be construed as being included in the scope of the invention defined in the appended claims.

EXAMPLE 1

Manufacture of Random Dispersion-Type Optical Body

By using polyethylene naphthalate (PEN) having a refractive index of 1.65 and a glass transition temperature of 120° C. as a dispersion component, and including 60 wt. % of polycarbonate, 39 wt. % of polycyclohexylene dimethylene terephthalate (PCTG) in which terephthalate as an acid component and ethyl glycol and cyclohexanedimethanol as diol components were polymerized at a molar ratio of 1:2, and 1 wt. % of phosphorous acid ($H_3PO_3$) as substrate components, the raw materials having a glass transition temperature of 112° C. were introduced into each of first and second extrusion units. In this case, for polyethylene naphthalate (PEN), polyethylene naphthalate (PEN) including 30 ppm of the residual amount of a Ge catalyst used in the polymerization process, and 1.5 wt. % of diethylene glycol (DEG), which is a polymerization by-product, was used.

The extrusion temperature of the substrate component and the dispersion component was set to 245° C., and the Cap. Rheometer was checked to correct the polymer flow through I.V. adjustment. The dispersion was induced to be randomly dispersed inside the substrate by passing through the flow path to which the filtration mixer was applied, and the substrate layer polymer was induced to spread in the coat hanger dies of FIGS. 8 and 9 to correct the flow rate and pressure gradient. Specifically, the width of a die inlet was 200 mm, and the thickness was 10 mm. In addition, the width of a die outlet was 1,260 mm, the thickness was 2.5 mm, and the flow rate was 1.0 m/min. Afterwards, a smoothing process was performed on the cooling and casting rolls, and it was stretched 6 times in the MD direction. Subsequently, heat setting was performed through a heater chamber at 180° C. for 2 minutes to manufacture a random dispersion-type optical body having a thickness of 120 μm with a cross-sectional structure as shown in FIG. 5. The refractive index of the dispersion component of the manufactured optical body was (nx: 1.88, ny: 1.58, nz: 1.58), and the refractive index of the substrate component was 1.58.

EXAMPLE 2

Manufacture of Random Dispersion-Type Optical Body

In the same manner as in Example 1, a random dispersion-type optical body having a cross-sectional structure as shown in FIG. 5 and an average aspect ratio and cross-sectional area of the dispersion as shown in Table 1 was manufactured.

However, for polyethylene naphthalate (PEN) used as a dispersion component, polyethylene naphthalate (PEN) including 45 ppm of the residual amount of a Ge catalyst used in the polymerization process and 2.0 wt. % of diethylene glycol (DEG), which was a polymerization by-product, was used.

EXAMPLE 3

Manufacture of Random Dispersion-Type Optical Body

In the same manner as in Example 1, a random dispersion-type optical body having a cross-sectional structure as shown in FIG. 5 was manufactured.

However, for polyethylene naphthalate (PEN) used as a dispersion component, polyethylene naphthalate (PEN) including 80 ppm of the residual amount of a Ge catalyst used in the polymerization process and 3.0 wt. % of diethylene glycol (DEG), which was a polymerization by-product, was used.

COMPARATIVE EXAMPLE 1

Manufacture of Random Dispersion-Type Optical Body

In the same manner as in Example 1, a random dispersion-type optical body having a cross-sectional structure as shown in FIG. 5 was manufactured.

However, for polyethylene naphthalate (PEN) used as a dispersion component, polyethylene naphthalate (PEN) including 140 ppm of the residual amount of a Ge catalyst used in the polymerization process and 3.0 wt. % of diethylene glycol (DEG), which was a polymerization by-product, was used.

EXPERIMENTAL EXAMPLE 1

The following physical properties were evaluated for the optical bodies manufactured through the above examples, and the results are shown in Table 1 below.

1. Relative Luminance

In order to measure the luminance of the manufactured optical bodies, the following was performed. After assembling a panel on a 32" direct-type backlight unit equipped with a reflective film, a light guide plate, a diffuser plate, and an optical body, luminance was measured at nine points using Topcon's BM-7 measurement device to show the average value.

The relative luminance represents the relative values of the luminances of the other Examples and Comparative Examples, when the luminance of the optical body of Example 1 was set to 100 (reference).

2. Haze

Haze was measured using the analysis equipment of a haze and transmittance measurement device (COH-400 which is a product of Nippon Denshoku Kogyo Co.).

3. Measurement Methods of Aspect Ratio, Cross-Sectional Area, and Number of Dispersions For the measurement of the dispersion aspect ratio, based on a cross-sectional photograph of 0.1 mm×0.1 mm in width and height, respectively, taken from the vertical cross-section of the optical body perpendicular to the extension direction through the FE-SEM, the aspect ratio was calculated by measuring the length in a longitudinal direction and the length in a transverse direction for each dispersion included in the cross-sectional photograph. In this case, the reliability of the numerical values for the cross-sectional area was secured by targeting those with a number of dispersions of 1,000 or more in the cross-sectional photograph.

Specifically, for the measurement of the length and the number, the cross-sectional area distribution (long axis length, short axis length, number) of all dispersions in the photograph was calculated through the ImageJ program by using the contrast difference between the dispersion and the substrate in the cross-sectional photograph of FESEM. Through this, the cross-sectional area of each of the dispersions was calculated through Relationship Formula 1 below.

$$\text{Cross-sectional area of dispersion }(\mu m^2) = 3.14 \times (\text{long axis length of dispersion} \times \text{short axis length of dispersion})/2 \quad [\text{Relationship Formula 1}]$$

In this case, the long axis length and the short axis length of the dispersion in Relationship Formula 1 refer the long axis and the short axis of the dispersion in the cross-section of the optical body perpendicular to the elongation direction of the optical body.

TABLE 1

| Classification | Example 1 | Example 2 | Example 3 | Comparative Example 1 |
|---|---|---|---|---|
| Average cross-sectional area of dispersion | 0.032 | 0.062 | 0.168 | 0.245 |
| Standard deviation of cross-sectional area of dispersion | 0.032 | 0.068 | 0.135 | 0.177 |
| Dispersion coefficient of cross-sectional area | 100% | 110% | 80% | 72% |
| Average aspect ratio of dispersion | 0.454 | 0.433 | 0.343 | 0.296 |
| Standard deviation of aspect ratio of dispersion | 0.191 | 0.187 | 0.117 | 0.082 |
| Dispersion coefficient of aspect ratio | 42% | 43% | 34% | 28% |
| Number of dispersions having cross-sectional area of 0.3 μm² or less | 100% included of total dispersions | 99.1% included of total dispersions | 88% included of total dispersions | 76% included of total dispersions |
| Number of dispersions having cross-sectional area of more than 0.01 μm² and 0.09 μm² or less | 80.8% included of total dispersions | 77.2% included of total dispersions | 31.7% included of total dispersions | 19.6% included of total dispersions |
| Relative luminance | 100 | 96 | 94 | 91 |
| Haze (%) | 14% | 19% | 25% | 28% |
| Degree of polarization | 89% | 85% | 83% | 82% |

COMPARATIVE EXAMPLE 2

Random Dispersion-Type Optical Body Manufactured in Example 1 of Korean Patent Application No. 10-2013-0169215

As described in Example 1 of Korean Patent Application No. 10-2013-0169215, a random dispersion-type optical body was manufactured, and the manufactured random dispersion-type optical body was confirmed to have the physical property values described in Table 2 below through the above experimental example.

TABLE 2

| Classification | Comparative Example 2 | Remarks |
|---|---|---|
| Group 1 | 48% of total dispersions | Among the dispersions with an aspect ratio of 1/2 or less, the cross-sectional |
| Group 2 | 40% of total dispersions | area of Group 1 is 0.2 to 2.0 μm², the cross-sectional area of Group 2 is more |
| Group 3 | 12% of total dispersions | than 2.0 μm² to 5.0 μm² or less, and the cross-sectional area of Group 3 is more |

TABLE 2-continued

| Classification | Comparative Example 2 | Remarks |
| --- | --- | --- |
| Relative luminance | 89 | than 5.0 μm² to 10.0 μm² or less |
| Haze (%) | 29% | |
| Degree of polarization | 82% | |

As can be confirmed from Tables 1 and 2, it could be confirmed that the optical bodies manufactured in Examples 1 to 3 not only had superior luminance values compared to the optical bodies manufactured in Comparative Examples 1 to 2, but also had low haze values and excellent degrees of polarization.

In addition, it was confirmed that among the optical bodies manufactured in Examples 1 to 3, the optical bodies manufactured in Example 1 not only had the most excellent luminance value, but also had a low haze value and excellent degree of polarization.

EXAMPLE 4

Manufacture of Random Dispersion-Type Optical Body

A random dispersion-type optical body was manufactured in the same manner as in Example 1.

However, by using polyethylene naphthalate (PEN) having a refractive index of 1.65 and a glass transition temperature of 115° C. as a dispersion component, and including 55 wt. % of polycarbonate, 44 wt. % of polycyclohexylene dimethylene terephthalate (PCTG) in which terephthalate as an acid component and ethyl glycol and cyclohexanedimethanol as diol components were polymerized at a molar ratio of 1:2, and 1 wt. % of phosphorous acid ($H_3PO_3$) as substrate components, the raw materials having a glass transition temperature of 108° C. were introduced into each of first and second extrusion units. In this case, for polyethylene naphthalate (PEN), polyethylene naphthalate (PEN) including 30 ppm of the residual amount of a Ge catalyst used in the polymerization process and 1.5 wt. % of diethylene glycol (DEG), which is a polymerization by-product, was used.

COMPARATIVE EXAMPLE 3

Manufacture of Random Dispersion-Type Optical Body

A random dispersion type optical body was manufactured in the same manner as in Example 1.

However, by using polyethylene naphthalate (PEN) having a refractive index of 1.65 and a glass transition temperature of 120° C. as a dispersion component, and including 50 wt. % of polycarbonate, 49 wt. % of polycyclohexylene dimethylene terephthalate (PCTG) in which terephthalate as an acid component and ethyl glycol and cyclohexanedimethanol as diol components were polymerized at a molar ratio of 1:2, and 1 wt. % of phosphorous acid ($H_3PO_3$) as substrate components, the raw materials having a glass transition temperature of 103° C. were introduced into each of first and second extrusion units. In this case, for polyethylene naphthalate (PEN), polyethylene naphthalate (PEN) including 30 ppm of the residual amount of a Ge catalyst used in the polymerization process and 1.5 wt. % of diethylene glycol (DEG), which is a polymerization by-product, was used.

COMPARATIVE EXAMPLE 4

Manufacture of Random Dispersion-Type Optical Body

A random dispersion-type optical body was manufactured in the same manner as in Example 1.

However, by using polyethylene naphthalate (PEN) having a refractive index of 1.65 and a glass transition temperature of 120° C. as a dispersion component, and including 70 wt. % of polycarbonate, 29 wt. % of polycyclohexylene dimethylene terephthalate (PCTG) in which terephthalate as an acid component and ethyl glycol and cyclohexanedimethanol as diol components were polymerized at a molar ratio of 1:2, and 1 wt. % of phosphorous acid ($H_3PO_3$) as substrate components, the raw materials having a glass transition temperature of 121° C. were introduced into each of first and second extrusion units. In this case, for polyethylene naphthalate (PEN), polyethylene naphthalate (PEN) including 30 ppm of the residual amount of a Ge catalyst used in the polymerization process and 1.5 wt. % of diethylene glycol (DEG), which is a polymerization by-product, was used.

COMPARATIVE EXAMPLE 5

Manufacture of Random Dispersion-Type Optical Body

A random dispersion-type optical body was manufactured in the same manner as in Example 1.

However, by using polyethylene naphthalate (PEN) having a refractive index of 1.65 and a glass transition temperature of 125° C. as a dispersion component, and including 60 wt. % of polycarbonate, 39 wt. % of polycyclohexylene dimethylene terephthalate (PCTG) in which terephthalate as an acid component and ethyl glycol and cyclohexanedimethanol as diol components were polymerized at a molar ratio of 1:2, and 1 wt. % of phosphorous acid ($H_3PO_3$) as substrate components, the raw materials having a glass transition temperature of 112° C. were introduced into each of first and second extrusion units. In this case, for polyethylene naphthalate (PEN), polyethylene naphthalate (PEN) including 30 ppm of the residual amount of a Ge catalyst used in the polymerization process and 1.5 wt. % of diethylene glycol (DEG), which is a polymerization by-product, was used.

EXPERIMENTAL EXAMPLE 2

The following physical properties were evaluated for the optical bodies manufactured through Examples 1, 4, and Comparative Examples 3 to 5, and the results are shown in Table 3 below.

1. Relative Luminance

In order to measure the luminance of the manufactured optical bodies, the following was performed. After assembling a panel on a 32" direct-type backlight unit equipped with a reflective film, a light guide plate, a diffuser plate, and an optical body, luminance was measured at nine points using Topcon's BM-7 measurement device to show the average value.

The relative luminance represents the relative values of the luminances of the other Examples and Comparative Examples, when the luminance of the optical body of Example 1 was set to 100 (reference).

2. Haze

Haze was measured using the analysis equipment of a haze and transmittance measurement device (COH-400 which is a product of Nippon Denshoku Kogyo Co.).

TABLE 3

| Classification | Example 1 | Example 4 | Comparative Example 3 | Comparative Example 4 | Comparative Example 5 |
|---|---|---|---|---|---|
| Relative luminance | 100 | 98 | 90 | 90 | 91 |
| Haze (%) | 14 | 25 | 35 | 34 | 32 |
| Degree of polarization (%) | 89 | 87 | 82 | 83 | 84 |

As can be confirmed from Table 3, it could be confirmed that the optical bodies manufactured in Examples 1 and 4 not only had superior luminance values compared to the optical bodies manufactured in Comparative Examples 3 to 5, but also had low haze values and excellent degrees of polarization.

In addition, it was confirmed that among the optical bodies manufactured in Example 1 and 4, the optical bodies manufactured in Example 1 not only had the most excellent luminance value, but also had a low haze value and excellent degree of polarization.

EXAMPLE 5

Manufacture of Random Dispersion-Type Optical Body

By using polyethylene naphthalate (PEN) having a refractive index of 1.65, and including 60 wt. % of polycarbonate, 39 wt. % of polycyclohexylene dimethylene terephthalate (PCTG) in which terephthalate as an acid component and ethyl glycol and cyclohexanedimethanol as diol components were polymerized at a molar ratio of 1:2, and 1 wt. % of phosphorous acid ($H_3PO_3$) as substrate components, the PC alloy raw materials were introduced into each of first and second extrusion units. In this case, for polyethylene naphthalate (PEN), a polyethylene naphthalate (PEN) polymer chip including 2.5 wt. % of diethylene glycol (DEG), which is a polymerization by-product that occurs in the process of polymerization, was used.

The extrusion temperature of the substrate component and the dispersion component was set to 245° C., and the Cap. Rheometer was checked to correct the polymer flow through I.V. adjustment. The dispersion was induced to be randomly dispersed inside the substrate by passing through the flow path to which the filtration mixer was applied, and the substrate layer polymer was induced to spread in the coat hanger dies of FIGS. 8 and 9 to correct the flow rate and pressure gradient. The flow rate was 1.0 m/min. Afterwards, a smoothing process was performed on the cooling and casting rolls. Then, it was stretched 6 times in the MD direction, and at this time, a predetermined force was applied in the TD direction to stretch in the MD direction by 1.1 times while being stretched. Subsequently, heat setting was performed through a heater chamber at 180° C. for 2 minutes to manufacture a random dispersion-type optical body as shown in Table 4 below having a thickness of 120 μm with a cross-sectional structure as shown in FIG. 2. The refractive index of the dispersion component of the manufactured optical body was (nx: 1.88, ny: 1.58, nz: 1.58), and the refractive index of the substrate component was 1.58. In addition, the width of the optical body was 158 cm.

COMPARATIVE EXAMPLE 6

Manufacture of Random Dispersion-Type Optical Body

While it was manufactured by performing in the same manner as in Example 5, no treatment such as stretching, clip fixing, or the like in the TD direction was performed in the stretching process, and a polyethylene naphthalate (PEN) polymer chip including 6.5 wt. % of diethylene glycol (DEG), which is a polymerization by-product, was used. By changing the width of a die outlet, a random dispersion-type optical body having a width of 90 cm as shown in Table 4 below was manufactured.

COMPARATIVE EXAMPLE 7

Manufacture of Random Dispersion-Type Optical Body

While it was manufactured by performing in the same manner as in Comparative Example 6, a random dispersion-type optical body having a width of 70 cm as shown in Table 4 below was manufactured by changing the width of a die outlet.

COMPARATIVE EXAMPLE 8

A multilayer reflective polarizer in which PEN and a PC alloy were alternately laminated with each of plate-like optical layers was manufactured. In this case, for PEN, a polyethylene naphthalate (PEN) polymer chip including 4.4 wt. % of diethylene glycol (DEG), which is a by-product of polymerization, was used, and it was manufactured using a slit-type extrusion spinneret. For the slit-type extrusion spinneret, Korean Patent Application No. 10-2012-0087416 by the same applicant of the present invention is incorporated herein by reference. Specifically, PEN as a dispersion, a substrate, and a PC alloy as a skin layer were respectively introduced into the first extrusion unit, the second extrusion unit, and the third extrusion unit. The extrusion temperature of PEN and the PC alloy was set to 295° C., and the Cap. Rheometer was checked to correct the polymer flow through I.V. adjustment, and an extrusion process was performed for the skin layer at a temperature level of 280° C.

Four composites having different average optical thicknesses were prepared using four slit-type extrusion molds of FIG. 17. Specifically, the first component transferred from the first extrusion unit was distributed to four slit-type extrusion molds, and the second component transferred from the second extrusion unit was transferred to four slit-type extrusion molds. One slit-type extrusion mold consisted of 300 layers, the thickness of the slit of the first slit-type extrusion mold of the bottom surface of the fifth mold distribution plate of FIG. 17 was 0.26 mm, the slit thickness of the second slit-type extrusion mold was 0.21 mm, the slit thickness of the third slit-type extrusion mold was 0.17 mm, the slit thickness of the fourth slit-type extrusion mold was 0.30 mm, and the diameter of the discharge port of the sixth mold distribution plate was 15 mm×15 mm. The four multilayered composites discharged through the four slit-type extrusion molds and the skin layer components conveyed through separate passages were laminated in a collection block to be laminated into a single core layer and a skin layer integrally formed on both sides of the core layer. The core layer polymer on which the skin layer was formed was induced to spread in the coat hanger dies of FIGS. 8 and 9 to correct the flow rate and pressure gradient. The flow rate was 1 m/min. Afterwards, a smoothing process was performed on the cooling and casting rolls, and it was stretched 6 times in the MD direction, and at this time, no force was applied in the TD direction. Subsequently, heat setting was performed through an IR heater at 180° C. for 2 minutes to manufacture a multilayer reflective polarizer as shown in FIG. 16. The refractive index of the first component of the manufactured reflective polarizer was (nx: 1.88, ny: 1.64, nz: 1.64), and the refractive index of the second component was 1.64. Group A had 300 layers (150 repeating units), and the repeating unit had a thickness of 168 nm, an average optical thickness of 275.5 nm, and an optical thickness deviation within 20%. Group B had 300 layers (150 repeating units), and the repeating unit had a thickness of 138 nm, an average optical thickness of 226.3 nm, and an optical thickness deviation within 20%. Group C had 300 layers (150 repeating units), and the repeating unit had a thickness of 110 nm, an average optical thickness of 180.4 nm, and an optical thickness deviation within 20%. Group D had 300 layers (150 repeat units), and the repeating unit had a thickness of 200 nm, an average optical thickness of 328 nm, and an optical thickness deviation within 20%. The manufactured multilayer reflective polarizer had a core layer thickness of 92.4 μm and a skin layer thickness of 153.8 μm, respectively, with a total thickness of 400 μm and a total width of 98 cm.

EXPERIMENTAL EXAMPLE 3

The following physical properties were evaluated for the optical bodies manufactured through Example 5, and Comparative Examples 6 to 8, and the results are shown in Table 4 below.
1. Luminance and Luminance Uniformity
An arbitrary first line parallel to the transmission axis of the manufactured optical body was selected, and a total of five samples having a size of 100 mm×100 mm of a square having a center point on the first line were sampled. In this case, two samples in the left direction and two samples in the right direction were sampled, centering on the first sample having the center point at a point where the first line was vertically bisected, but the distance between adjacent samples was 50 mm.
Subsequently, in order to measure luminance for each sample, after assembling a panel on a direct-type backlight unit provided in the order of a reflective film, a light guide plate, a diffuser plate, and a reflective polarizing film, luminance at 9 points was measured using Topcon's BM-7 measurement device to show the average value. In this case, the backlight unit was manufactured and used to match the size of the sample.
After calculating the average luminance and standard deviation of the luminance of the five samples through the average luminance value of each sample, the luminance dispersion coefficient was calculated through Mathematical Formula 3 below.

[Mathematical Formula 3]

$$\text{Luminance dispersion coefficient (\%)} = \frac{\text{standard deviation of luminance of samples}}{\text{Average luminance of samples}} \times 100$$

In addition, with respect to the average luminance of the five samples, the average luminance of Example 5 was based on 100%, and the average luminance of the remaining Examples and Comparative Examples was shown as relative luminance.
2. Measurement Methods of Aspect Ratio, Cross-Sectional Area, and Number of Dispersions
For the measurement of the dispersion aspect ratio, based on the cross-sectional photograph taken with respect to the vertical cross-section perpendicular to the stretching direction of the optical body through the FE-SEM, the length in the longitudinal direction of each dispersion included in the cross-sectional photograph and the length in the transverse direction were measured to calculate the aspect ratio. In this case, the reliability of the numerical values for the cross-sectional area was secured by targeting those with a number of dispersions of 1,000 or more in the cross-sectional photograph.
Specifically, for the measurement of the length and the number, the cross-sectional area distribution (long axis length, short axis length, number) of all dispersions in the photograph was calculated through the ImageJ program by using the contrast difference between the dispersion and the substrate in the cross-sectional photograph of FE-SEM. Through this, the cross-sectional area of each of the dispersions was calculated through Relationship Formula 1 below.

Cross-sectional area of dispersion (μm$^2$)=π×long axis length of dispersion/2×short axis length of dispersion/2 [Relationship Formula 1]

3. Thickness Deviation
For the measurement of the luminance dispersion coefficient, the thickness based on the center point of each sample that was sampled was measured, and then, the thickness percentage of other samples was calculated based on the sample thickness of the maximum thickness as 100%. After counting the number of samples with a thickness percentage difference exceeding 1%, the excess number was evaluated as 5 points for 0, 4 points for 1, 3 points for 2, 2 points for 3, and 1 point for 4.

TABLE 4

| Classification | Example 5 | Comparative Example 6 | Comparative Example 7 | Comparative Example 8 |
| --- | --- | --- | --- | --- |
| | Random | Random | Random | Multilayered type |
| Thickness (cm) | 158 | 90 | 70 | 97 |
| DEG (wt. %) | 2.5 | 6.5 | 6.5 | 4.4 |
| TD stretching | Stretching ratio 1:1.1 | None | None | None |

TABLE 4-continued

| Classification | Example 5 | Comparative Example 6 | Comparative Example 7 | Comparative Example 8 |
|---|---|---|---|---|
| Ratio of dispersions with a cross-sectional area of 0.3 μm² or less (%) | 83 | 36 | 36 | — |
| Luminance uniformity based on first line | 0.47% | 3.32% | 2.60% | 1.11% |
| Luminance uniformity based on second line | 0.48% | 4.06% | 3.05% | 1.20% |
| Relative luminance | 100 | 90.9 | 91.8 | 105.5 |
| Thickness deviation | 5 | 1 | 1 | 3 |

As can be confirmed in Table 4, in the case of Comparative Example 8, which is a multilayer optical body, it was confirmed that the content of by-products in the polymer chip forming the layer was high, and the luminance uniformity based on the first line or the second line was excellent, even when there was no treatment in the TD direction.

However, in the case of Example 5 and Comparative Examples 6 to 7, which are polymer dispersion-type optical fibers including dispersions, it could be confirmed that the luminance uniformity was significantly changed by various factors such as width, the content of by-products, the cross-sectional area, and the like.

In addition, when Comparative Examples 6 and 7 are compared, it could be confirmed that in the case of Comparative Example 6 having a width of 85 cm or more, a problem of luminance uniformity was further generated compared to Comparative Example 7.

Simple modifications or changes of the present invention can be easily carried out by those skilled in the art, and all such modifications or changes can be considered to be included in the scope of the present invention.

INDUSTRIAL APPLICABILITY

The present invention relates to an optical body and a display device including the same, and more particularly, the present invention relates to an optical body capable of maximizing luminance improvement of the optical body while minimizing optical loss of the optical body, and a display device including the same.

The invention claimed is:

1. An optical body, comprising:
a substrate; and
a plurality of dispersions dispersed and comprised inside the substrate,
wherein the plurality of dispersions have an average aspect ratio of 0.5 or less, and the number of dispersions having a cross-sectional area of 0.3 μm² or less is 80% or more of the total dispersions;
wherein the optical body satisfies Conditions (1) and (2) below:
(1) glass transition temperature ($T_g$) of dispersion>glass transition temperature ($T_g$) of substrate,
(2) the difference in the glass transition temperatures of a dispersion and a substrate is within a range of 3 to 9° C.; and
wherein the glass transition temperature ($T_g$) of the substrate is 110° C. to 130° C.

2. The optical body of claim 1, wherein in the plurality of dispersions, the number of dispersions having a cross-sectional area of more than 0.01 μm² to 0.09 μm² or less is 70% to 90% of the total dispersions.

3. The optical body of claim 1, wherein the plurality of dispersions have a cross-sectional dispersion coefficient of 90% to 120% according to Mathematical Formula 2 below:

[Mathematical Formula 2]

$$\text{Cross-sectional dispersion coefficient (\%)} = \frac{\text{Standard deviation of cross-sectional area of dispersion}}{\text{Average cross-sectional area of dispersion}} \times 100.$$

4. An optical body, comprising:
a substrate; and
a plurality of dispersions dispersed and comprised inside the substrate,
wherein the plurality of dispersions have an average cross-sectional area of 1 μm² or less, and an aspect ratio dispersion coefficient of 40% or more according to Mathematical Formula 1 below:

[Mathematical Formula 1]

$$\text{Aspect ratio dispersion coefficient (\%)} = \frac{\text{Standard deviation of aspect ratio of dispersion}}{\text{Average aspect ratio of dispertion}} \times 100;$$

wherein the optical body satisfies Conditions (1) and (2) below:
(1) Glass transition temperature ($T_g$) of dispersion>Glass transition temperature ($T_g$) of substrate
(2) The difference in the glass transition temperatures of a dispersion and a substrate is within a range of 3 to 9° C.; and
wherein the glass transition temperature ($T_g$) of the substrate is 110° C. to 130° C.

5. The optical body of claim 4, wherein the plurality of dispersions have an average aspect ratio of 0.3 to 0.5.

6. The optical body of claim 1, wherein the optical body has a haze of 25% or less.

7. The optical body of claim 1, wherein the optical body transmits a first polarized light parallel to a transmission axis and reflects a second polarized light parallel to an extinction axis.

8. The optical body of claim 7, wherein the optical body has a luminance dispersion coefficient of 2% or less according to Mathematical Formula 3 below, which is measured based on an in-plane virtual first line parallel to the transmission axis:

[Mathematical Formula 3]

$$\text{Luminance dispersion coefficient (\%)} = \frac{\text{standard deviation of luminance of samples}}{\text{Average luminance of samples}} \times 100.$$

9. The optical body of claim 8, wherein the included angle which is an acute angle with the first line is ±60°, and the luminance dispersion coefficient which is measured based on an in-plane virtual second line passing through a bisecting point of the first line is within 2%.

10. A display device, comprising the optical body of claim 1.

11. The optical body of claim 4, wherein the optical body has a haze of 25% or less.

12. The optical body of claim 4, wherein the optical body transmits a first polarized light parallel to a transmission axis and reflects a second polarized light parallel to an extinction axis.

13. The optical body of claim 12, wherein the optical body has a luminance dispersion coefficient of 2% or less according to Mathematical Formula 3 below, which is measured based on an in-plane virtual first line parallel to the transmission axis:

[Mathematical Formula 3]

$$\text{Luminance dispersion coefficient (\%)} = \frac{\text{standard deviation of luminance of samples}}{\text{Average luminance of samples}} \times 100.$$

14. The optical body of claim 13, wherein the included angle which is an acute angle with the first line is ±60°, and the luminance dispersion coefficient which is measured based on an in-plane virtual second line passing through a bisecting point of the first line is within 2%.

15. A display device, comprising the optical body of claim 4.

* * * * *